(12) United States Patent
Nakano

(10) Patent No.: US 12,268,641 B2
(45) Date of Patent: Apr. 8, 2025

(54) MOVING DEVICE

(71) Applicant: LIFEHUB INC., Tokyo (JP)

(72) Inventor: Hiroshi Nakano, Tokyo (JP)

(73) Assignee: LIFEHUB INC., Tokyo (JP)

( * ) Notice: Subject to any disclaimer, the term of this patent is extended or adjusted under 35 U.S.C. 154(b) by 0 days.

(21) Appl. No.: 18/270,756

(22) PCT Filed: Jan. 13, 2022

(86) PCT No.: PCT/JP2022/000916
§ 371 (c)(1),
(2) Date: Jul. 3, 2023

(87) PCT Pub. No.: WO2022/230248
PCT Pub. Date: Nov. 3, 2022

(65) Prior Publication Data
US 2024/0293274 A1    Sep. 5, 2024

(30) Foreign Application Priority Data

Apr. 26, 2021 (JP) ................................. 2021-074008

(51) Int. Cl.
*A61G 5/06* (2006.01)
(52) U.S. Cl.
CPC .................... *A61G 5/061* (2013.01)
(58) Field of Classification Search
CPC ............ A61G 2203/42; A61G 2203/36; A61G 5/061; A61G 5/1059; A61G 2203/38;
(Continued)

(56) References Cited

U.S. PATENT DOCUMENTS 4,326,622 A * 4/1982 Ellzey .................... A61G 5/061
                                                        198/324
5,062,519 A * 11/1991 Haruta .................... B66B 23/12
                                                        198/333
(Continued)

FOREIGN PATENT DOCUMENTS

CN       106240669 A    12/2016
EP         3338752 B1    10/2019
(Continued)

OTHER PUBLICATIONS

Mar. 22, 2022 International Search Report issued in International Patent Application No. PCT/JP2022/000916.
(Continued)

*Primary Examiner* — James A Shriver, II
*Assistant Examiner* — Hilary L Johns
(74) *Attorney, Agent, or Firm* — Oliff PLC

(57) ABSTRACT

A moving device includes: two leg portions each including an end-portion wheel and an intermediate wheel; a placement portion supported by the two leg portions; and a control unit configured to control the two leg portions. The moving device is configured such that, under a state of four-wheel ground contact in which the end-portion wheel and the intermediate wheel are in contact with the ground, when the end-portion wheel is moved from the boarding area to the step of the escalator and/or when the end-portion wheel is moved from the step to the landing area of the escalator, a wheel speed of the end-portion wheel is controlled by the control unit.

11 Claims, 19 Drawing Sheets

(58) Field of Classification Search
CPC .......... A61G 5/042; A61G 5/047; A61G 5/06;
A61G 5/063; A61G 5/068; A61G 5/1078;
A61G 5/1089; A61G 2203/14; A61G
2203/18; A61G 2203/30; A61G 2203/70;
A61G 2203/72; A61G 5/04; A61G 5/125;
A61G 5/128; B60P 3/423; B66B 21/04;
B66B 29/08; B66B 31/006; B62K 11/007
USPC .......................................................... 280/63
See application file for complete search history.

(56) References Cited

U.S. PATENT DOCUMENTS

| | | | |
|---|---|---|---|
| 10,266,097 B2* | 4/2019 | Takahata | A61G 5/061 |
| 11,173,079 B2* | 11/2021 | Moore | A61G 5/06 |
| 11,931,302 B2* | 3/2024 | Campbell | B62K 11/007 |
| 2018/0178706 A1* | 6/2018 | Takahata | A61G 5/042 |
| 2020/0085654 A1* | 3/2020 | Moore | A61G 5/06 |
| 2024/0101202 A1* | 3/2024 | Park | B62D 63/068 |

FOREIGN PATENT DOCUMENTS

| | | |
|---|---|---|
| EP | 3689314 A1 | 8/2020 |
| JP | 2006-82142 A | 3/2006 |
| JP | 2007-290054 A | 11/2007 |
| JP | 2008-126349 A | 6/2008 |
| JP | 2009-101908 A | 5/2009 |
| JP | 2011-255426 A | 12/2011 |
| JP | 5555953 B2 | 7/2014 |
| JP | 2017-131609 A | 8/2017 |
| JP | 2018-102496 A | 7/2018 |
| JP | 2018-184038 A | 11/2018 |
| JP | 2019-512287 A | 5/2019 |
| JP | 7122779 B1 | 8/2022 |
| WO | 2017/140694 A1 | 8/2017 |

OTHER PUBLICATIONS

Mar. 22, 2022 Written Opinion issued in International Patent Application No. PCT/JP2022/000916.
Nov. 1, 2022 Notice of Reasons for Refusal issued in Japanese Patent Application No. 2022-549550.
Apr. 25, 2023 Notice of Reasons for Refusal issued in Japanese Patent Application No. 2022-549550.
Sep. 28, 2021 Notice of Reasons for Refusal issued in Japanese Patent Application No. 2021-102180.
Feb. 22, 2022 Office Action issued in Japanese Patent Application No. 2021-102180.
Sep. 12, 2023, Decision of Refusal issued in Japanese Patent Application No. 2022-549550.
Sep. 12, 2023, Decision of Dismissal of Amendment issued in Japanese Patent Application No. 2022-549550.
Jan. 30, 2025 European Extended Search Report issued in European Patent Application No. 22795171.2.

* cited by examiner

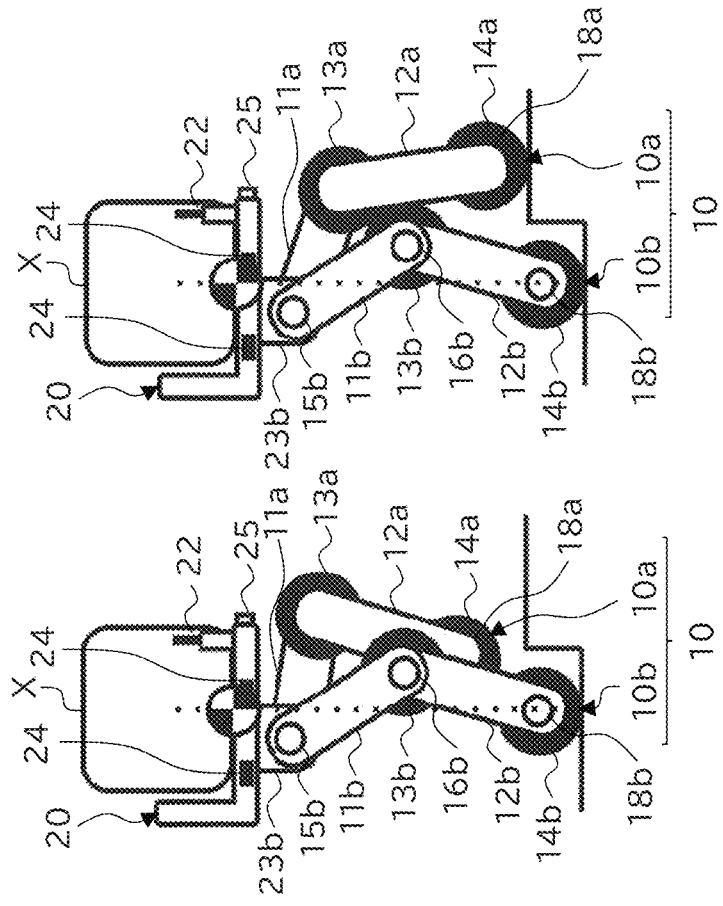

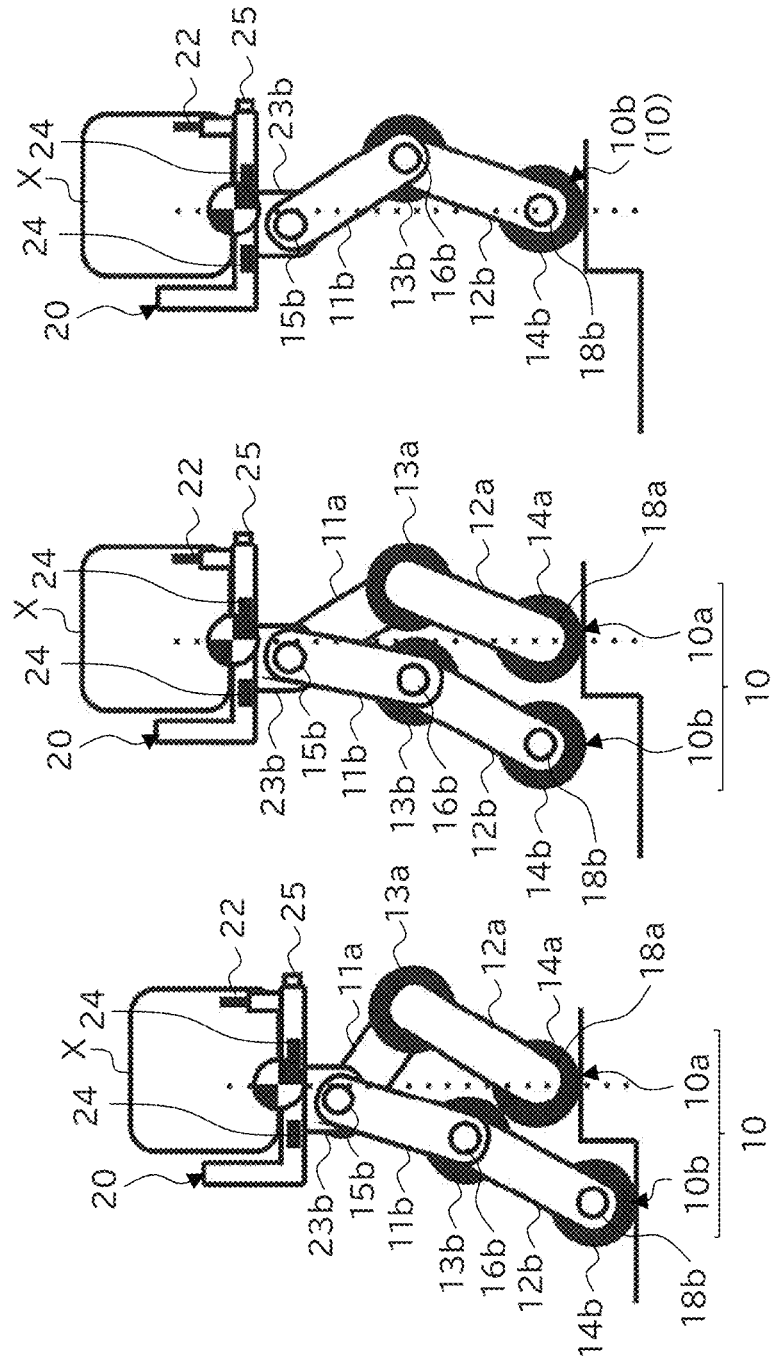

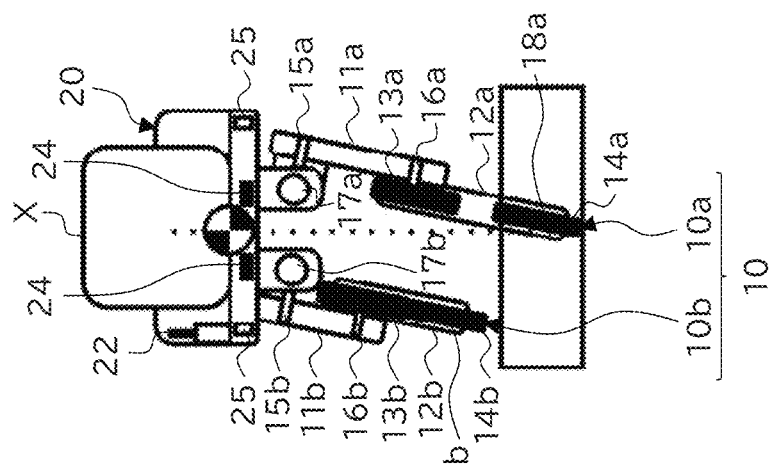
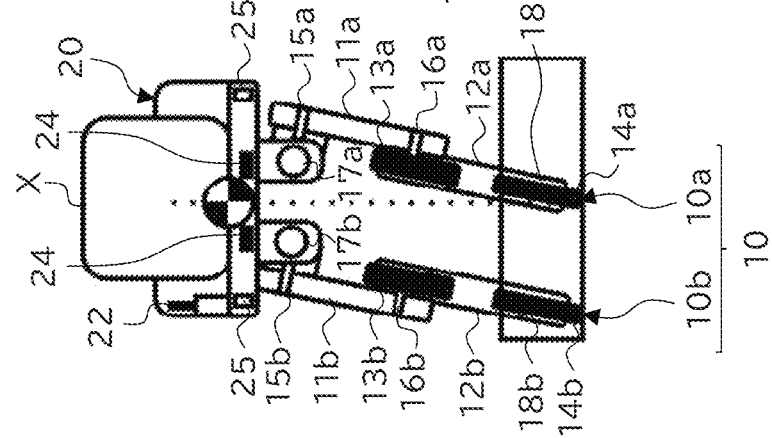
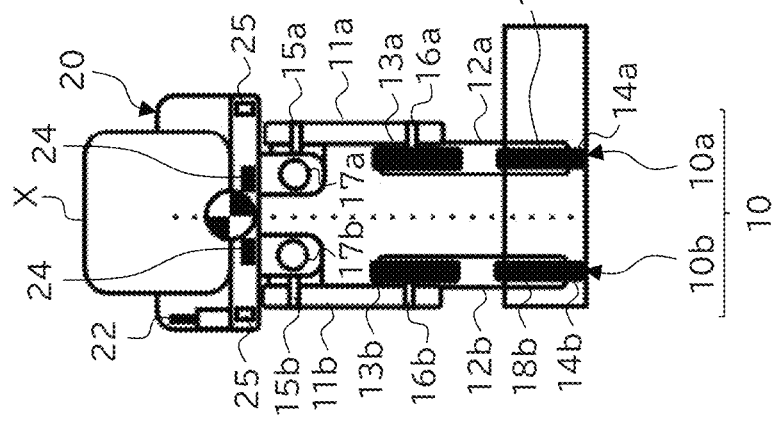

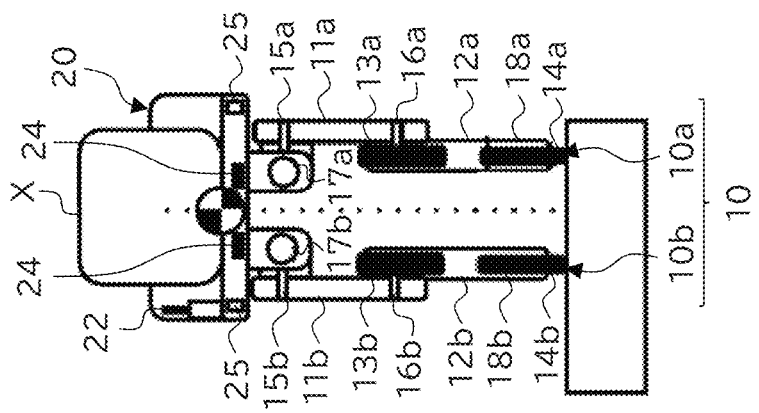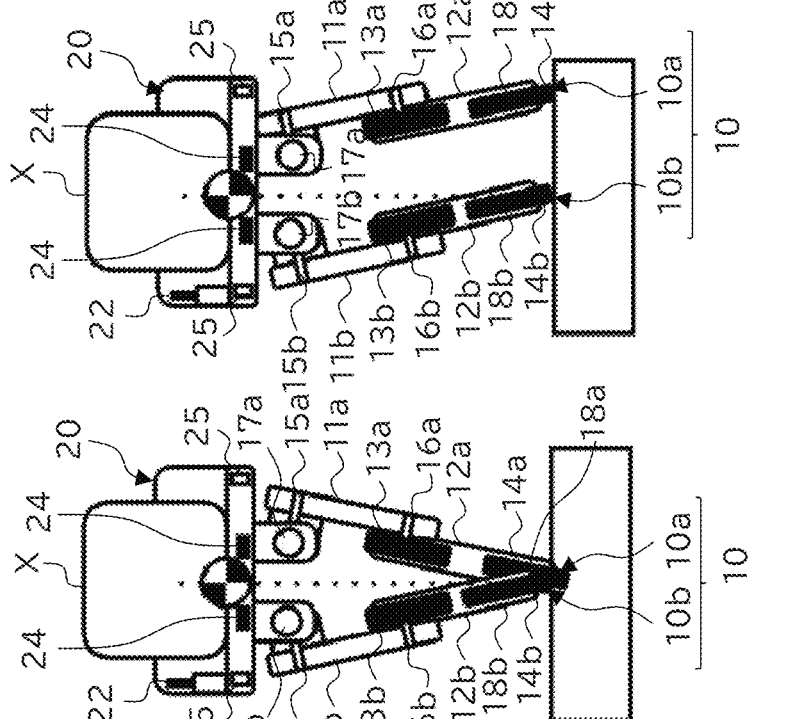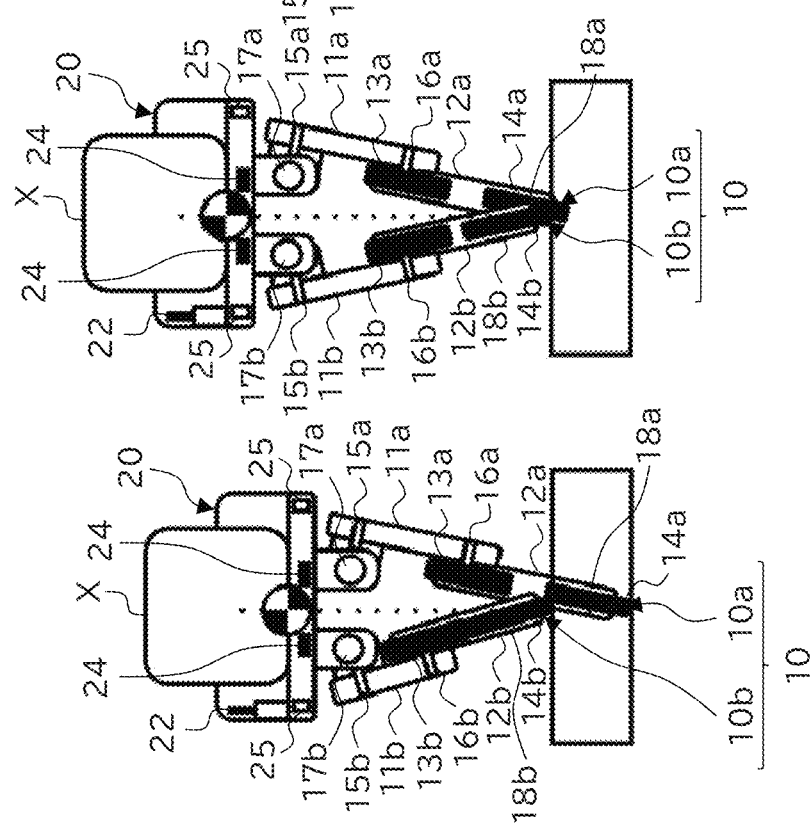
FIG. 9 (a)  FIG. 9 (b)  FIG. 9 (c)  FIG. 9 (d)

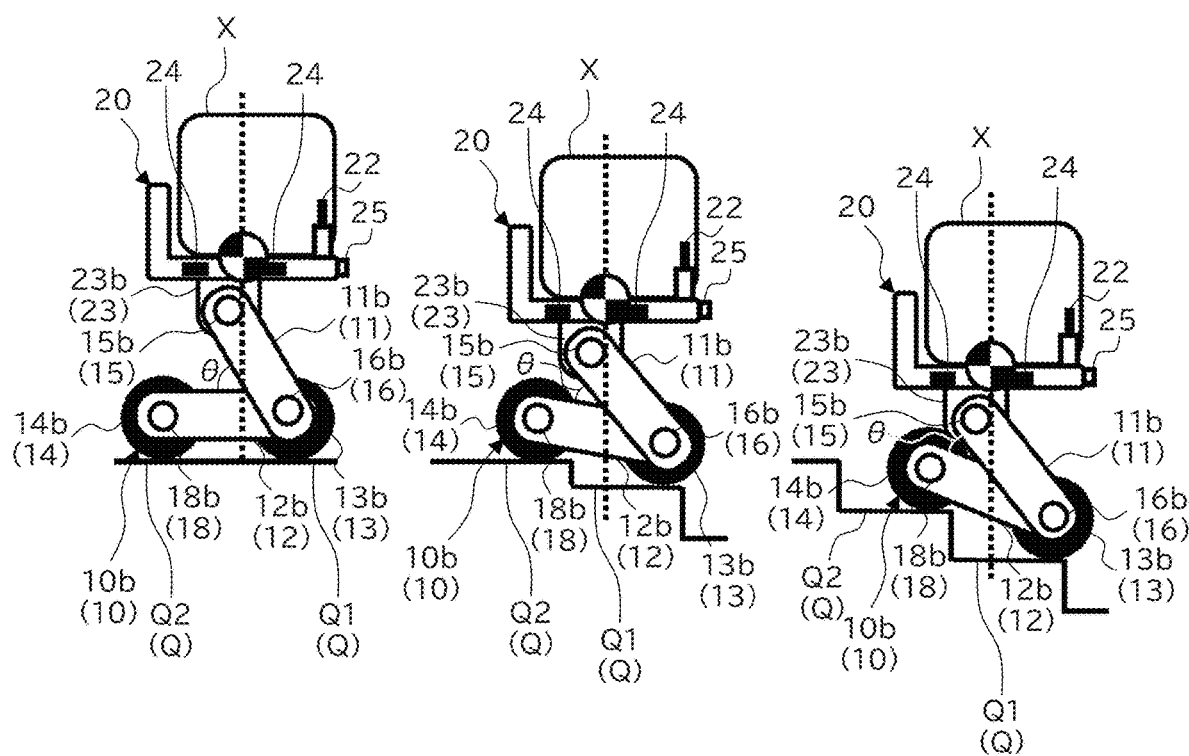

MOVING DEVICE

TECHNICAL FIELD

The present invention relates to a moving device for moving a person, an object, or the like while having the person, the object, or the like loaded thereon, and more specifically, to a moving device capable of ascending and descending stairs (including steps, the same holds true in the following) or an escalator under a state in which the moving device has a target object loaded thereon.

BACKGROUND ART

Some elderly people and disabled people have difficulty in moving their locations. In particular, ascending and descending stairs impose a heavy burden to the body. Hitherto, as a device for moving a person while having the person loaded thereon, there has been known, for example, a stair ascending/descending-type moving vehicle (Patent Literature 1) including a pair of right and left wheel support members each formed of four links and four wheels on each side, a two-legged moving device (Patent Literature 2) including two legs and a hip portion for turnably supporting joints provided at bases of the two legs, or a bipedal-type moving mechanism (Patent Literature 3) including two legs having wheels at their end portions.

CITATION LIST

Patent Literature

[PTL 1] JP 5555953 B2
[PTL 2] JP 2011-255426 A
[PTL 3] JP 2007-290054 A

SUMMARY OF INVENTION

Technical Problem

Incidentally, an escalator has a speed difference at a boundary between a step and a boarding/landing area thereof. Accordingly, in order to allow the moving device to get on or off the escalator, it is required to take measures to prevent a moving object from dropping or falling out due to vibrations or impacts caused by this speed difference.

However, the related-art various moving devices do not assume getting on and off an escalator, and problems to be caused by the speed difference and means for solving the problems are not disclosed or suggested.

The present invention has been made in view of the above-mentioned circumstances, and has an object to provide and achieve a moving device capable of absorbing the speed difference, thereby being capable of safely getting on and off an escalator while having a moving object loaded thereon.

Solution to Problem

A moving device according to the present invention is a device for moving a moving object while having the moving object loaded thereon. The moving device includes: two leg portions each including an end-portion wheel and an intermediate wheel; a placement portion supported by the two leg portions; and a control unit configured to control the two leg portions. The moving device is configured such that, under a state of four-wheel ground contact in which the end-portion wheel and the intermediate wheel are in contact with a ground, when the end-portion wheel is moved from a boarding area to a step of an escalator and/or when the end-portion wheel is moved from the step to a landing area of the escalator, a wheel speed of the end-portion wheel is controlled by the control unit.

The moving device according to the present invention may also be configured such that, under a state of two-wheel ground contact in which the end-portion wheel is in contact with a ground, when the end-portion wheel is moved from a boarding area to a step of an escalator and/or when the end-portion wheel is moved from the step to a landing area of the escalator, a translational speed of the moving device is controlled by the control unit.

Advantageous Effects of Invention

In the moving device according to the present invention, when the end-portion wheel is moved from the boarding area to the step of the escalator and/or when the end-portion wheel is moved from the step to the landing area, the wheel speed of the end-portion wheel is controlled. In this manner, the speed difference between the boarding area and the step or between the landing area and the step can be absorbed, and hence the moving device can safely get on and off the escalator while having the moving object loaded thereon.

BRIEF DESCRIPTION OF DRAWINGS

FIG. 6(a), FIG. 6(b), and FIG. 6(c) are control explanatory views of a posture in a front-rear direction in a case of climbing the stairs.

FIG. 7(a), FIG. 7(b), and FIG. 7(c) are control explanatory views of the posture in the front-rear direction in the case of climbing the stairs.

FIG. 8(a), FIG. 8(b), and FIG. 8(c) are control explanatory views of a posture in a right-left direction in the case of climbing the stairs.

FIG. 9(a), FIG. 9(b), FIG. 9(c), and FIG. 9(d) are control explanatory views of the posture in the right-left direction in the case of climbing the stairs.

FIG. 19(a), FIG. 19(b), and FIG. 19(c) are control explanatory views of a posture at the time of exiting from the escalator.

DESCRIPTION OF EMBODIMENTS

Embodiment

An example of a moving device according to the present invention is described with reference to the drawings. The moving device according to the present invention is a device for moving a person or object X (hereinafter referred to as "moving object X") or the like while having the moving object X or the like loaded thereon. In this case, a moving device for moving a person while having the person loaded thereon (chair-type moving device) is described as an example. In this application, in a traveling direction of the moving device, a front side is expressed as "front," a rear side is expressed as "rear," a left side is expressed as "left," a right side is expressed as "right," an upper side is expressed as "upper," and a lower side is expressed as "lower."

Figure 2:
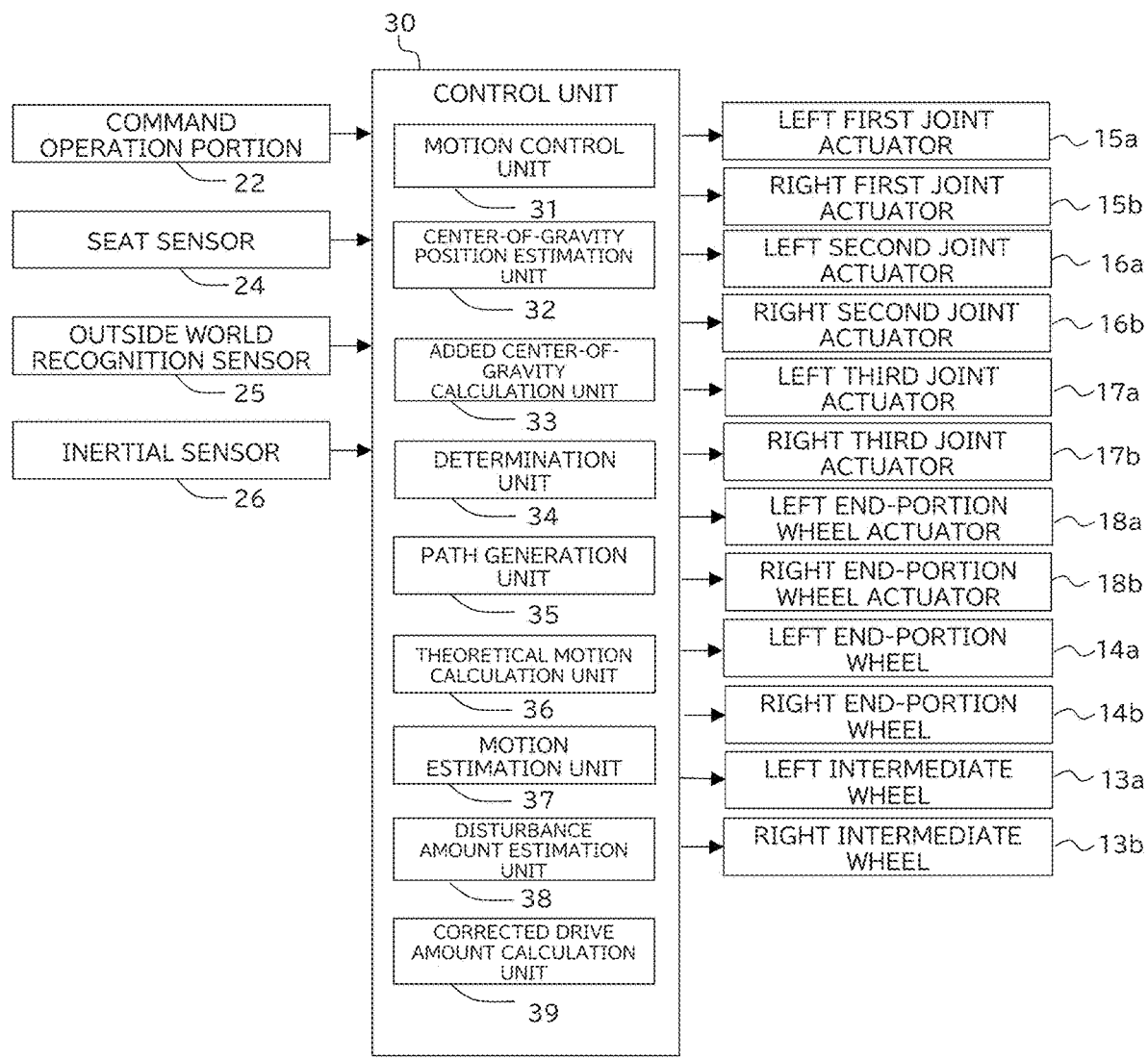
FIG. 2 is a functional block diagram for illustrating an example of the moving device according to the present invention.

Further, in this application, an "added center-of-gravity position" refers to a center-of-gravity position obtained by adding up a center-of-gravity position of the moving device and a center-of-gravity position of the moving object X. The center-of-gravity position of the moving object X can be set to, for example, a center-of-gravity position estimated by a center-of-gravity position estimation unit 32 (FIG. 2) from a load of the moving object X applied to a seat sensor 24 installed on a placement portion 20.

The center-of-gravity position of the moving device can be calculated based on center-of-gravity positions of respective components forming the moving device (by adding up the center-of-gravity positions of the respective components). The components forming the moving device referred to here include an upper link 11, a lower link 12, an intermediate wheel 13, an end-portion wheel 14, a first joint actuator 15, a second joint actuator 16, a third joint actuator 17, and an end-portion wheel actuator 18 of a leg portion 10 to be described later.

Specifically, the center-of-gravity position of the moving device can be calculated as follows. The weight, the center-of-gravity position, and the moment of inertia of each component forming the moving device are known. Accordingly, a relative positional relationship of the components is identified from a rotational angle of each of the actuators 15 to 18, and the center-of-gravity position of each component is calculated from the identified positional relationship. Then, the center-of-gravity positions of the respective components are added up so that the center-of-gravity position of the moving device can be calculated.

Further, in this application, an "end-portion wheel ground-contact position" refers to a ground-contact position of the end-portion wheel 14 with respect to a ground surface or a floor surface (hereinafter referred to as "ground-contact surface"). The end-portion wheel ground-contact position is set for each end-portion wheel 14 of each leg portion 10. The end-portion wheel ground-contact positions of both the leg portions 10 are located side by side in a case in which the end-portion wheels 14 of both the leg portions 10 are not shifted from each other in a front-rear direction, and are shifted from each other in the front-rear direction in a case in which the end-portion wheels 14 of both the leg portions 10 are shifted from each other in the front-rear direction.

In the following description, getting on an escalator E is referred to as "entering," and getting off the escalator E is referred to as "exiting." Further, among boarding/landing areas located before the escalator E, a boarding/landing area F on the entrance side of the escalator E is referred to as "boarding area F1," and a boarding/landing area F on the exit side of the escalator E is referred to as "landing area F2." The "boarding area F1" and the "landing area F2" are relative concepts. In an ascending escalator E, the lower boarding/landing area F is the boarding area F1, and the upper boarding/landing area F is the landing area F2. Meanwhile, in a descending escalator E, the upper boarding/landing area F is the boarding area F1, and the lower boarding/landing area F is the landing area F2.

Now, the moving device according to this embodiment is specifically described. As an example, a moving device illustrated in FIG. 1(a) and FIG. 1(b) includes a leg portion 10, a placement portion 20 (hereinafter referred to as "chair portion 20") coupled to the leg portion 10, and a control unit 30 (FIG. 2) for controlling the leg portion 10.

Figure 1A:
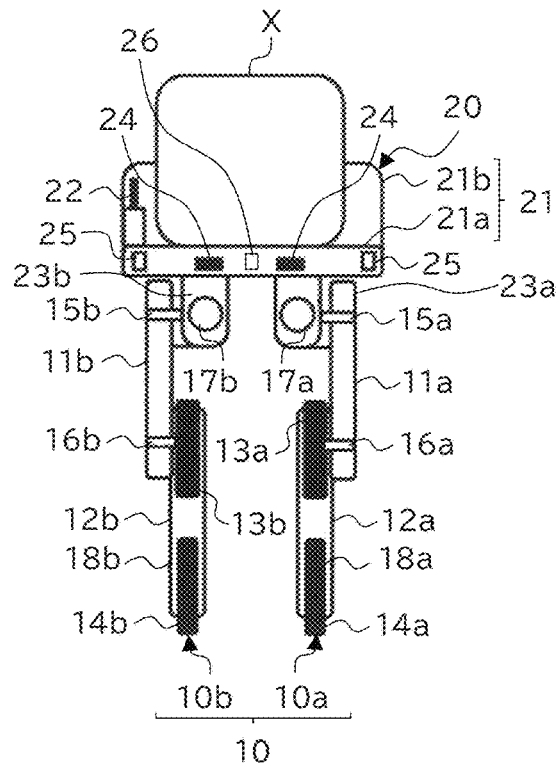
FIG. 1(a) is a front view for illustrating an example of a moving device according to the present invention.
Figure 1B:
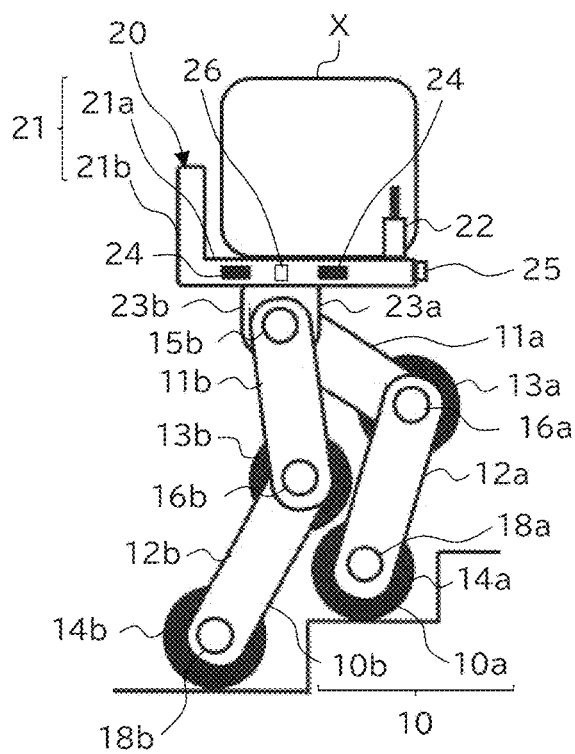
FIG. 1(b) is a side view of a state of climbing one step of stairs.

The leg portion 10 supports the chair portion 20. As illustrated in FIG. 1(a) and FIG. 1(b), a leg portion 10a on the left side in an advancing direction (hereinafter referred to as "left leg portion 10a") includes a left upper link 11a, a left lower link 12a, a left intermediate wheel 13a, a left end-portion wheel 14a, a left first joint actuator 15a, a left second joint actuator 16a, a left third joint actuator 17a, and a left end-portion wheel actuator 18a.

The left upper link 11a has its upper end side rotatably coupled to a left bracket 23a provided on a bottom surface of the chair portion 20, and the left lower link 12a has its upper end side rotatably coupled to the left upper link 11a.

The left intermediate wheel 13a is arranged at a coupling position between the left upper link 11a and the left lower link 12a, and is rotatably coupled through use of a coupling tool used for the coupling between the left upper link 11a and the left lower link 12a. The left intermediate wheel 13a can also be provided at, in addition to the coupling position between the left upper link 11a and the left lower link 12a, a position on the left upper link 11a side of the left lower link 12a, a position on the left lower link 12a side of the left upper link 11a, or other positions.

The left end-portion wheel 14a is rotatably coupled on the lower end side of the left lower link 12a. The left end-portion wheel 14a is provided so that its bottom surface protrudes downward with respect to a lower end of the left lower link 12a so as to be in contact with the ground surface (floor surface).

The left first joint actuator 15a is drive means for driving the left upper link 11a in the front-rear direction, and is provided at a coupling part between the left upper link 11a and the left bracket 23a. The left upper link 11a turns in the front-rear direction in response to the operation of the left first joint actuator 15a.

The left second joint actuator 16a is drive means for driving the left lower link 12a in the front-rear direction, and is provided at a coupling part between the left upper link 11a and the left lower link 12a. The left lower link 12a turns in the front-rear direction in response to the operation of the left second joint actuator 16a.

The left third joint actuator 17a is drive means for driving the left upper link 11a in a right-left direction (inward/outward direction), and is provided at a coupling part between the left upper link 11a and the left bracket 23a. The left upper link 11a turns in the right-left direction in response to the operation of the left third joint actuator 17a.

The left end-portion wheel actuator 18a is drive means for driving the left end-portion wheel 14a in a forward/reverse direction (front-rear direction), and is provided at a coupling part between the left lower link 12a and the left end-portion wheel 14a. The left end-portion wheel 14a rotates in the forward/reverse direction in response to the operation of the left end-portion wheel actuator 18a. The left intermediate wheel 13a in this embodiment is brought into a free state so as to be rotated in the forward/reverse direction without an actuator.

A leg portion 10b on the right side in the advancing direction (hereinafter referred to as "right leg portion 10b") includes a right upper link 11b, a right lower link 12b, a right intermediate wheel 13b, a right end-portion wheel 14b, a right first joint actuator 15b, a right second joint actuator 16b, a right third joint actuator 17b, and a right end-portion wheel actuator 18b.

The right upper link 11b has its upper end side rotatably coupled to a right bracket 23b provided on the bottom surface of the chair portion 20, and the right lower link 12b has its upper end side rotatably coupled to the right upper link 11b.

The right intermediate wheel 13b is arranged at a coupling position between the right upper link 11b and the right lower link 12b, and is rotatably coupled through use of a coupling tool used for the coupling between the right upper link 11b and the right lower link 12b. The right intermediate wheel 13b can also be provided at, in addition to the coupling position between the right upper link 11b and the right lower link 12b, a position on the right upper link 11b side of the right lower link 12b, a position on the right lower link 12b side of the right upper link 11b, or other positions.

The right end-portion wheel 14b is rotatably coupled on the lower end side of the right lower link 12b. The right end-portion wheel 14b is provided so that its bottom surface protrudes downward with respect to a lower end of the right lower link 12b so as to be in contact with the ground surface (floor surface).

The right first joint actuator 15b is drive means for driving the right upper link 11b in the front-rear direction, and is provided at a coupling part between the right upper link 11b and the right bracket 23b. The right upper link 11b turns in the front-rear direction in response to the operation of the right first joint actuator 15b.

The right second joint actuator 16b is drive means for driving the right lower link 12b in the front-rear direction, and is provided at a coupling part between the right upper link 11b and the right lower link 12b. The right lower link 12b turns in the front-rear direction in response to the operation of the right second joint actuator 16b.

The right third joint actuator 17b is drive means for driving the right upper link 11b in the right-left direction (inward/outward direction), and is provided at a coupling part between the right upper link 11b and the right bracket 23b. The right upper link 11b turns in the right-left direction in response to the operation of the right third joint actuator 17b.

The right end-portion wheel actuator 18b is drive means for driving the right end-portion wheel 14b in the forward/reverse direction (front-rear direction), and is provided at a coupling part between the right lower link 12b and the right end-portion wheel 14b. The right end-portion wheel 14b rotates in the forward/reverse direction in response to the operation of the right end-portion wheel actuator 18b. The right intermediate wheel 13b in this embodiment is brought into a free state so as to be rotated in the forward/reverse direction without an actuator.

As both the first joint actuators 15, both the second joint actuators 16, both the third joint actuators 17, and both the end-portion wheel actuators 18, existing actuators including motors, reducers, encoders, brakes, and the like can be used.

The chair portion 20 is a part on which a person sits, and includes a seating portion 21, a command operation portion 22, and a coupling portion 23. The seating portion 21 allows a person to sit thereon. The command operation portion 22 allows a person to input a control signal. The coupling portion 23 allows the chair portion 20 to be coupled to the leg portion 10.

The seating portion 21 includes a seat 21a and a back rest 21b. The structure of the seating portion 21 may be other than this structure. For example, a seating portion 21 including the seat 21a, the back rest 21b, and a leg rest (not shown), a seating portion including only the seat 21a and not including the back rest 21b, a seating portion formed of only the seat 21a and the leg rest, and the like can be employed.

In the seating portion 21, there are provided a seat sensor 24, an outside world recognition sensor 25, and an inertial sensor 26. The seat sensor 24 detects a person's load applied to the seat 21a. The outside world recognition sensor 25 recognizes an external situation (for example, presence or absence of stairs, an escalator, or an obstacle) around the moving device. The inertial sensor 26 detects a translational motion or a rotational motion in orthogonal three-axis directions.

The seat sensor 24 is provided on the front surface side of the seat 21a, and the outside world recognition sensor 25 and the inertial sensor 26 are provided on the front side and the lateral side of the seat 21a. Installation positions of the respective sensors are merely an example, and the sensors can also be provided at locations other than those locations.

As the seat sensor 24, for example, a pressure sensor can be used. It is preferred that a plurality of seat sensors 24 be installed on the seat 21a. A detection signal obtained by the seat sensor 24 is transmitted to the center-of-gravity position estimation unit 32 (FIG. 2) of the control unit 30 to be described later so that the center-of-gravity position of the person is estimated by the center-of-gravity position estimation unit 32 based on this detection signal.

As the outside world recognition sensor 25, for example, a laser rangefinder can be used. The laser rangefinder radiates a laser light beam so as to measure a distance to an object based on reflected light of the laser light beam. As the outside world recognition sensor 25, a sensor other than the laser rangefinder can also be used. With the outside world recognition sensor 25, for example, presence or absence of stairs, an escalator, and an obstacle (wall, pillar, door, furniture, person, or the like) is recognized. A detection signal obtained by the outside world recognition sensor 25 is transmitted to a determination unit 34 (FIG. 2) of the control unit 30 to be described later so that whether or not the stairs are passable, whether or not the escalator is enterable, and the like are determined based on this detection signal.

As the inertial sensor 26, for example, a gyro sensor or an acceleration sensor can be used. With the inertial sensor 26, for example, an actual motion (moving speed, inclination, or the like) of the moving device is detected. A detection signal obtained by the inertial sensor 26 is transmitted to a motion estimation unit 37 (FIG. 2) of the control unit 30 to be described later so that an actual operation (hereinafter referred to as "actual motion") is estimated by the motion estimation unit 37 based on this detection signal. As the inertial sensor 26, a sensor other than the gyro sensor and the acceleration sensor can also be used.

The command operation portion 22 is means for allowing a person to input a control signal to the control unit 30. As the command operation portion 22, an existing input device, such as a joystick or a touch panel, can be used. In this embodiment, through use of the command operation portion 22, a control signal of an operation such as moving forward, moving backward, turning, moving on stairs, entering an escalator, or exiting from an escalator can be input. The input control signal is transmitted to the control unit 30. An operation to be performed when each control signal is transmitted is described later.

The coupling portion 23 is a part for coupling the two leg portions 10. As an example, the coupling portion 23 illustrated in FIG. 1(*a*) and FIG. 1(*b*) includes the left bracket 23*a* and the right bracket 23*b* which are provided in a protruding manner on the back surface side of the seat 21*a*. The left bracket 23*a* couples the left leg portion 10*a*, and the right bracket 23*b* couples the right leg portion 10*b*. The coupling portion 23 shown here is merely an example, and the configuration of the coupling portion 23 is not particularly limited as long as the coupling portion 23 can rotatably couple the two leg portions 10.

The control unit 30 is means for controlling the actuators 15 to 18, both the intermediate wheels 13, and both the end-portion wheels 14 forming the leg portions 10. The control unit 30 can be formed of a computer including a processor, a memory, and the like as main configurations.

The control unit 30 in this embodiment includes a motion control unit 31, the center-of-gravity position estimation unit 32, an added center-of-gravity calculation unit 33, the determination unit 34, a path generation unit 35, a theoretical motion calculation unit 36, the motion estimation unit 37, a disturbance amount estimation unit 38, and a corrected drive amount calculation unit 39. The motion control unit 31 controls both the leg portions 10. The center-of-gravity position estimation unit 32 estimates the center-of-gravity position from a load applied to the seat sensor 24. The added center-of-gravity calculation unit 33 calculates the added center-of-gravity position. The determination unit 34 determines whether or not the stairs can be ascended or descended, whether or not the escalator is enterable, or the like based on the detection signal obtained by the outside world recognition sensor 25. The path generation unit 35 generates a moving path (pathway) before ascending or descending the stairs, before entering the escalator, before exiting from the escalator, or the like. The theoretical motion calculation unit 36 calculates, based on the added center-of-gravity position, a theoretical operation which occurs when each of the actuators 15 to 18 is driven (hereinafter referred to as "theoretical motion"). The motion estimation unit 37 estimates the actual motion from an actual motion obtained by the inertial sensor 26. The disturbance amount estimation unit 38 estimates, when the actual motion and the theoretical motion have a difference, a disturbance amount based on an amount of this difference. The corrected drive amount calculation unit 39 calculates a corrected drive amount of each of the actuators 15 to 18 based on the estimated disturbance amount.

In this embodiment, the pathway of the moving device is generated in the control unit 30. The pathway is information identified by coordinate values and time, and is continuously generated at any time while the moving device is moved through use of a current location as a reference. The moving device moves along the generated pathway in accordance with an instruction input through the command operation portion 22.

In the control unit 30 in this embodiment, control in a stationary state, control at the time of moving forward, control at the time of moving backward, control at the time of turning, control of a posture in the front-rear direction at the time of ascending or descending stairs, control of a posture in the right-left direction at the time of ascending or descending stairs, control of a motion against a disturbance, posture control at the time of entering the escalator, posture control at the time of exiting from the escalator, posture control on the escalator, switching control from four wheels to two wheels, switching control from two wheels to four wheels, and the like are performed. Now, those types of control are specifically described.

First, the control in the stationary state, the control at the time of moving forward, the control at the time of moving backward, and the control at the time of turning are described.

[Control in Stationary State]

When no command operation is performed through the operation of the command operation portion 22, the right and left end-portion wheels 14 are driven so that a position in the front-rear direction of the added center-of-gravity position and a position in the front-rear direction of the end-portion wheel ground-contact position of each of both the end-portion wheels 14 match each other. After the driving, a rotational angular speed of each of the right and left end-portion wheels 14 is controlled so that the rotational angular speed finally converges to zero.

[Control at Time of Moving Forward]

When a command operation of moving forward is performed through the operation of the command operation portion 22, the end-portion wheels 14 are driven so that the position in the front-rear direction of the added center-of-gravity position is located on the front side with respect to the position in the front-rear direction of the end-portion wheel ground-contact position of each of both the end-portion wheels 14. Thus, a difference is caused between the added center-of-gravity position and the end-portion wheel ground-contact position of each of both the end-portion wheels 14. The magnitude of this difference takes a value proportional to the magnitude of the command operation.

After the command operation of moving forward is performed through the operation of the command operation portion 22, when the command operation is canceled, the moving device drives the end-portion wheels 14 so that the position in the front-rear direction of the added center-of-gravity position is located on the rear side with respect to the end-portion wheel ground-contact position of each of both the end-portion wheels 14. Thus, a difference is caused between the added center-of-gravity position and the end-portion wheel ground-contact position of each of both the end-portion wheels 14. After the driving, the rotational angular speed of each of the end-portion wheels 14 is controlled so that the rotational angular speed finally converges to zero, and the control in the stationary state is performed after the rotational angular speed of each of the end-portion wheels 14 comes close to around zero.

[Control at Time of Moving Backward]

When a command operation of moving backward is performed through the operation of the command operation portion 22, the end-portion wheels 14 are driven so that the position in the front-rear direction of the added center-of-gravity position is located on the rear side with respect to the position in the front-rear direction of the end-portion wheel ground-contact position of each of both the end-portion wheels 14. Thus, a difference is caused between the added center-of-gravity position and the end-portion wheel ground-contact position of each of both the end-portion wheels 14. The magnitude of this difference takes a value proportional to the magnitude of the command operation.

After the command operation of moving backward is performed through the operation of the command operation portion 22, when the command operation is canceled, the moving device drives the end-portion wheels 14 so that the position in the front-rear direction of the added center-of-gravity position is located on the front side with respect to the end-portion wheel ground-contact position of each of both the end-portion wheels 14. Thus, a difference is caused between the added center-of-gravity position and the end-portion wheel ground-contact position of each of both the end-portion wheels 14. After the driving, the rotational angular speed of each of the end-portion wheels 14 is controlled so that the rotational angular speed finally converges to zero, and the control in the stationary state is performed after the rotational angular speed of each of the end-portion wheels 14 comes close to around zero.

[Control at Time of Turning]

When a command operation of turning is performed through the operation of the command operation portion 22, both the end-portion wheels 14 are driven so that a difference is caused in the number of revolutions of the right and left end-portion wheels 14. The magnitude of this difference takes a value proportional to the magnitude of the command operation of turning.

Specifically, in a case of a command operation of turning right, the number of revolutions of the left end-portion wheel 14a is set so as to be larger than the number of revolutions of the right end-portion wheel 14b. In a case of a command operation of turning left, the number of revolutions of the right end-portion wheel 14b is set so as to be larger than the number of revolutions of the left end-portion wheel 14a.

An average value of the numbers of revolutions of the right and left end-portion wheels 14 is set to match the number of revolutions of the end-portion wheels 14 which is based on the command operation of moving forward or moving backward at the time when a person performs the command operation of turning. When the command operation of turning is performed through the operation of the command operation portion 22 in a case in which no command operation of moving forward or moving backward is performed, the average value of the numbers of revolutions of the right and left end-portion wheels 14 is set to zero.

Next, the control of the posture in the front-rear direction at the time of ascending or descending stairs and the control of the posture in the right-left direction at the time of ascending or descending stairs are described. In this embodiment, before ascending or descending stairs, determination on whether or not to start the ascending or descending of the stairs is performed. Specifically, when the stairs are recognized by the outside world recognition sensor 25 and a command of moving to the stairs is input through the operation of the command operation portion 22, whether or not to start the ascending or descending of the stairs (whether or not the stairs can be ascended or descended) is determined. This determination is performed by, for example, a procedure illustrated in FIG. 3.

[Determination on Whether or Not Stairs Are Passable]

(1) The outside world shape is acquired by the outside world recognition sensor 25 (Step S001). The acquisition of the outside world shape is continuously performed by the outside world recognition sensor 25, and the acquired outside world shape is transmitted to the control unit 30.

(2) Whether or not the stairs are present is determined from the outside world shape acquired by the outside world recognition sensor 25 (Step S002).

(3) As a result of the determination of Item (2), when it is recognized that the stairs are absent, the moving device continues a planar movement (Step S003).

(4) As a result of the determination of Item (2), when it is recognized that the stairs are present, the shape of the stairs (hereinafter referred to as "stair shape") is acquired by the outside world recognition sensor 25 (Step S004).

(5) From the stair shape acquired by the outside world recognition sensor 25, a path for ascending or descending the stairs (for example, an optimal path such as a shortest path) is generated by the path generation unit 35 (Step S005).

(6) After the path is generated by the path generation unit 35, whether or not this path is passable is determined (Step S006).

(7) As a result of the determination of Item (6), when it is determined that this path is impassable, the moving device stops before the stairs (Step S007). In this case, the person riding on the moving device can be informed that this path is impassable through information display means (not shown), notification means (not shown), or the like.

(8) As a result of the determination of Item (6), when it is determined that this path is passable, the moving device starts passing (ascending or descending) of the stairs (Step S008).

(9) Subsequently, Items (2) to (8) are repeated so that the moving device sequentially ascends or descends the stairs.

[Procedure of Path Generation]

Figure 4:
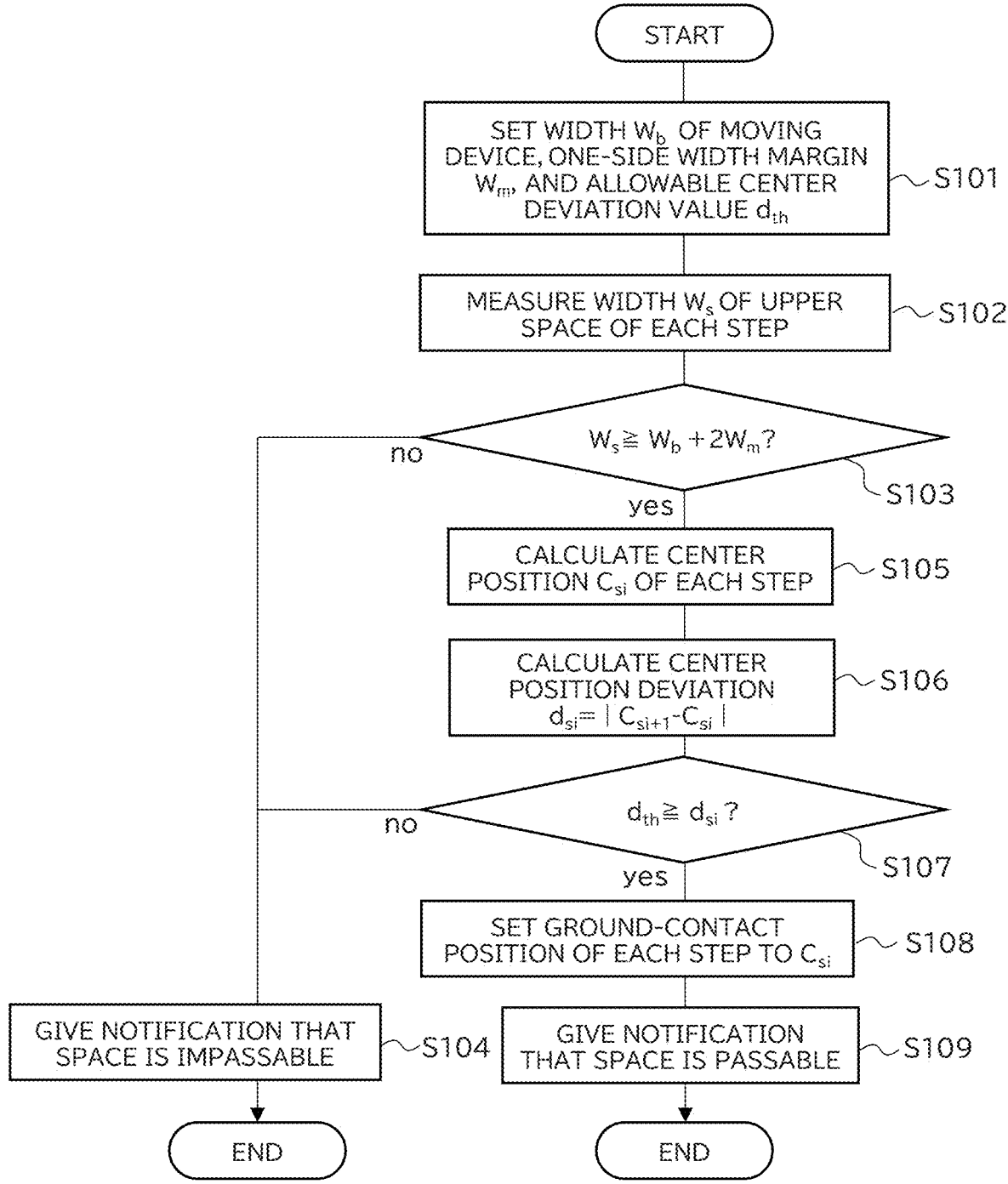
FIG. 4 is a flow chart for illustrating an example of a procedure of path generation in a path generation unit.

The path generation of Item (5) is performed by, for example, a procedure illustrated in FIG. 4.

(1) A width $W_b$ of the moving device, a one-side margin $W_m$ in a width direction of a stair upper space (hereinafter referred to as "one-side width margin $W_m$") (FIG. 5(*a*)), and an allowable deviation value $d_{th}$ in the width direction from a center position of each step with respect to a center position of a next step (hereinafter referred to as "allowable center deviation value $d_{th}$") are set (Step S101).

Figure 5:
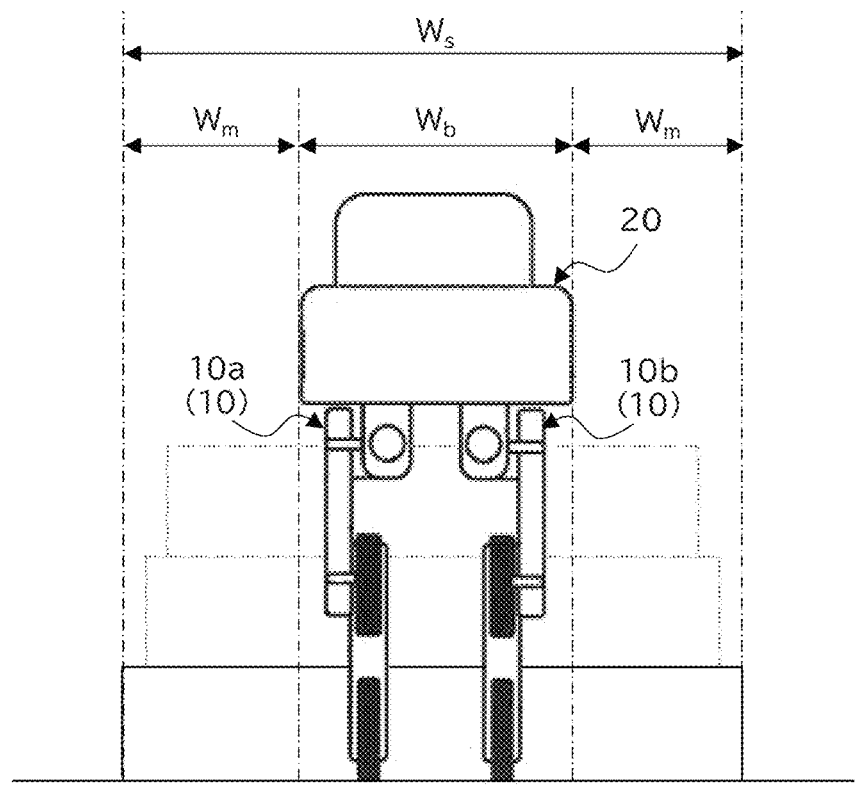
FIG. 5(a) is an explanatory view of a width of the moving device, a one-side margin in a width direction of a stair upper space, and a width of an upper space of each step.
FIG. 5(b) is an explanatory view of a center position and a center position deviation.
Figure 5:
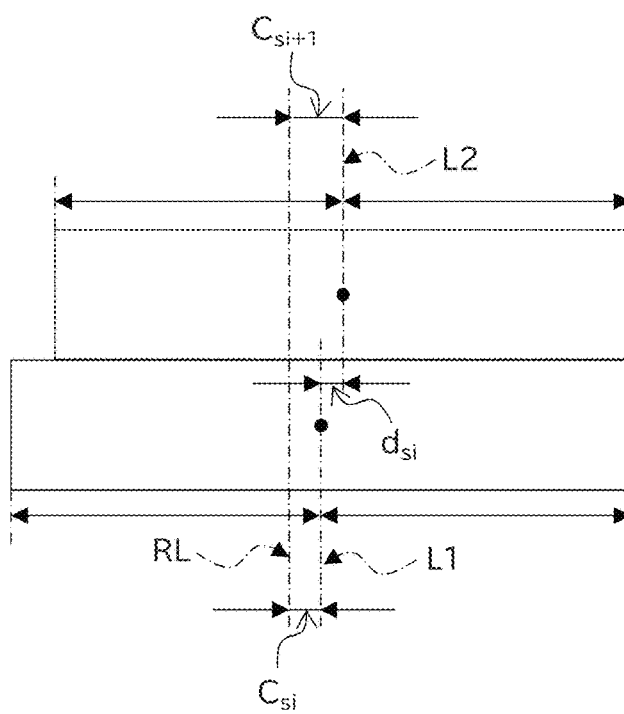

(2) A width $W_s$ of an upper space of each step (FIG. 5(*a*)) is measured based on the shape of the stairs obtained by the outside world recognition sensor 25 (Step S102).

(3) Whether or not the moving device can pass the space of each step is determined based on whether or not $W_s \geq W_b + 2W_m$ (Expression 1) is satisfied (Step S103).

(4) When Expression 1 is not satisfied in Item (3), it is determined that the space is impassable, and the person riding on the moving device is notified that the space is impassable through the information display means (not shown) or the like (Step S104).

(5) When Expression 1 is satisfied in Item (3), center positions $C_{si}$, $C_{si+1}$ . . . of the respective steps are calculated based on the stair shape obtained by the outside world recognition sensor 25 (Step S105). Specifically, as illustrated in FIG. 5(b), the center positions $C_{si}$, $C_{si+1}$ . . . of the respective steps are calculated based on distances between a reference line RL which is set in advance and is used in common to the steps, and center lines L1, L2 . . . each obtained by dividing the corresponding step in half in the width direction.

(6) After the center position $C_{si}$ of each step is calculated in Item (5), a center position deviation $d_{si}=|C_{si+1}-C_{si}|$ (Expression 2) is calculated for every adjacent steps (for example, first step and second step, and second step and third step) (Step S106).

(7) Whether or not the allowable center deviation value $d_{th}$ set in Item (1) and the center position deviation $d_{si}$ calculated in Item (6) satisfy $d_{th} \geq d_{si}$ (Expression 3) is determined (Step S107).

(8) When Expression 3 is not satisfied in Item (7) (when the allowable center deviation value $d_{th}$ is lower than the center position deviation $d_{si}$), it is determined that the space is impassable, and the person riding on the moving device is notified that the space is impassable through the information display means (not shown) or the like (Step S104).

(9) When Expression 3 is satisfied in Item (7) (when the allowable center deviation value $d_{th}$ is higher than the center position deviation $d_{si}$), the ground-contact position of each step is set to the center position $C_{si}$ of each step (Step S108).

(10) After the ground-contact position of each step is set to the center position $C_{si}$ of each step in Item (9), the person riding on the moving device is notified that the space is passable through the information display means (not shown) or the like (Step S109).

The ground-contact position of each step can also be set so that the change in the width direction of the ground-contact position of each step is minimized within a range in which the margin in the width direction can be ensured. In this case, the ground-contact position of each step is calculated so that the total sum of the center position deviations of the respective steps is minimized.

Figure 3:
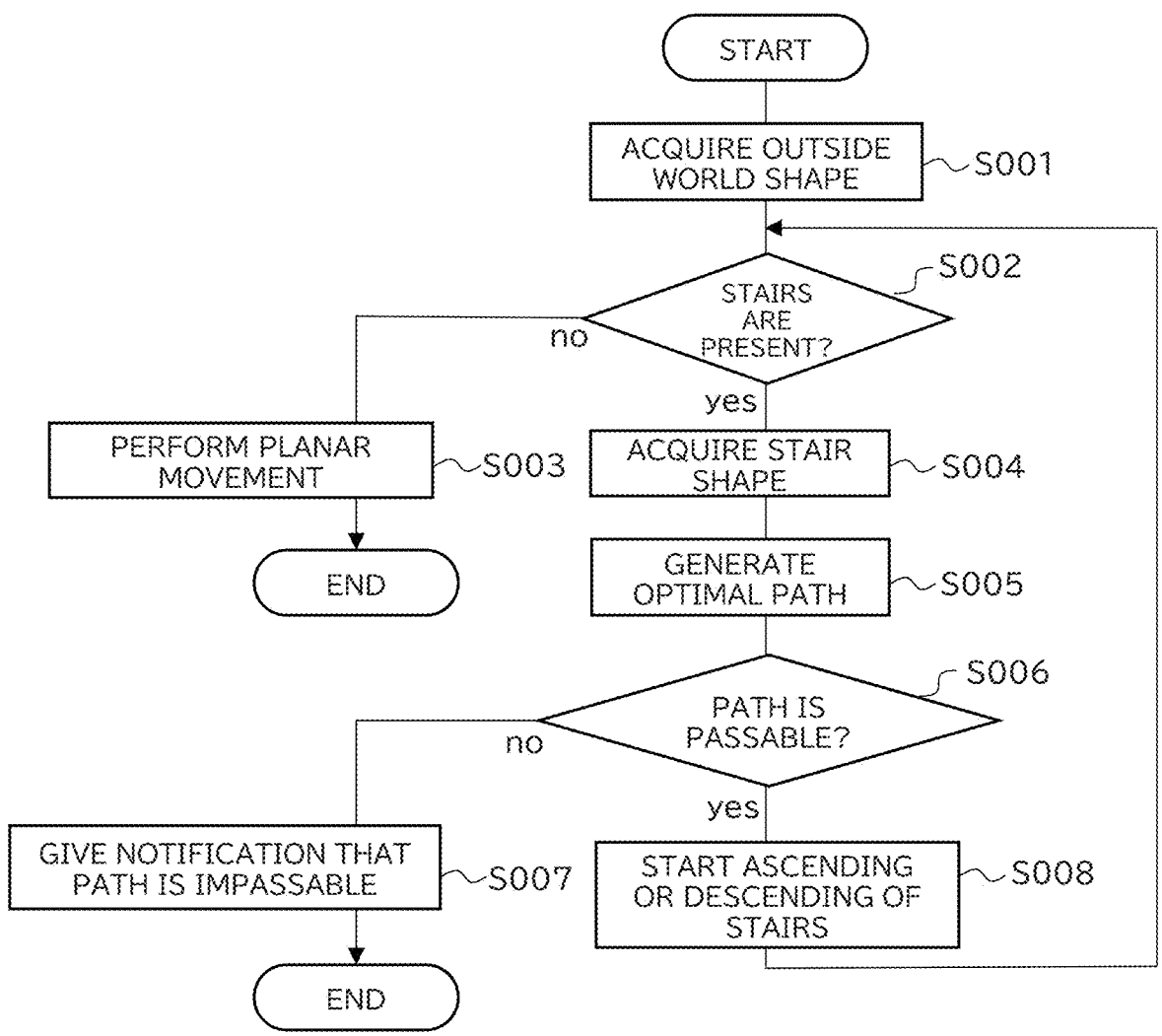
FIG. 3 is a flow chart for illustrating an example of a procedure for determining whether or not the stairs can be ascended or descended.

When the ascending or descending of the stairs is started through the procedure illustrated in FIG. 3 and FIG. 4, the posture of the moving device is controlled as follows. Here, the posture control in the front-rear direction at the time of ascending or descending stairs and the posture control in the right-left direction at the time of ascending or descending stairs are separately described.

[Posture Control in Front-Rear Direction at Time of Ascending or Descending Stairs]

The control unit 30 determines which of both the leg portions 10 is to be raised in accordance with the path generated by the path generation unit 35 (FIG. 6(a)). Here, a case of raising the left leg portion 10a and thereafter raising the right leg portion 10b is given as an example.

The left first joint actuator 15a and the left second joint actuator 16a are driven so that the left end-portion wheel 14a of the raised left leg portion 10a moves to the next end-portion wheel ground-contact position (FIG. 6(b)). Here, the next end-portion wheel ground-contact position means a ground-contact position of the left end-portion wheel 14a of the left leg portion 10a in a tread of the next step of the step on which the moving device is currently standing.

At this time, the added center-of-gravity position also moves forward due to the movement of the raised left leg portion 10a in the forward direction, and hence the right first joint actuator 15b and the right second joint actuator 16b of the unraised right leg portion 10b are driven so that the end-portion wheel ground-contact position of the unraised right leg portion 10b and the position in the front-rear direction of the moved added center-of-gravity position match each other.

After it is confirmed that the left end-portion wheel 14a of the raised left leg portion 10a is in contact with the ground at the next end-portion wheel ground-contact position, both the first joint actuators 15 and both the second joint actuators 16 of both the leg portions 10 are driven so that the end-portion wheel ground-contact position of the left leg portion 10a and the position in the front-rear direction of the added center-of-gravity position match each other (FIG. 6(c) and FIG. 7(a)).

After that, the actuators 15 to 18 are driven based on a difference in height of the front and rear end-portion wheel ground-contact positions (end-portion wheel ground-contact position of the left end-portion wheel 14a and end-portion wheel ground-contact position of the right end-portion wheel 14b) so that the heights of the chair portion 20 and the end-portion wheel 14 (end-portion wheel ground-contact position) are simultaneously changed by the amount of this height (FIG. 7(b) and FIG. 7(c)). The heights of the chair portion 20 and the end-portion wheel 14 are not always required to be changed simultaneously, and a slight error may be provided.

In a phase in which the end-portion wheel 14 is in one-wheel ground-contact at the time of ascending or descending stairs, posture control is performed by driving the end-portion wheel 14 so that the end-portion wheel ground-contact position of the end-portion wheel 14 in contact with the ground and the position in the front-rear direction of the added center-of-gravity position match each other.

The posture control in the front-rear direction of the moving device can also be performed through use of a counteracting force obtained when a weight such as a battery is moved in the front-rear direction, or can also be performed by installing a flywheel on the chair portion 20 so that a gyroscopic moment is used.

Here, the case of raising the left leg portion 10a and thereafter raising the right leg portion 10b to ascend stairs is given as an example, but an operation of a case of raising the right leg portion 10b and thereafter raising the left leg portion 10a to ascend stairs is also similar thereto.

[Posture Control in Right-left Direction at Time of Ascending or Descending Stairs]

The control unit 30 determines which of both the leg portions 10 is to be raised in accordance with the path generated by the path generation unit 35 (FIG. 8(a)). Here, a case of raising the right leg portion 10b and thereafter raising the left leg portion 10a is given as an example.

The left third joint actuator 17a of the unraised left leg portion 10a is driven so that the ground-contact position of the unraised left leg portion 10a and the position in the right-left direction of the added center-of-gravity position match each other (FIG. 8(b)).

The right first joint actuator 15b and the right second joint actuator 16b are driven so that the right end-portion wheel 14b of the raised right leg portion 10b moves to the next end-portion wheel ground-contact position (ground-contact position of the right end-portion wheel 14b of the right leg portion 10b in the tread of the next step of the step on which the moving device is currently standing) (FIG. 8(c) and FIG. 9(a)). At this time, in order to prevent the added center-ofgravity position from moving in the right-left direction due to the raising of the right leg portion 10b, the raised-side right third joint actuator 17b of the right leg portion 10b is driven so that the change of the added center-of-gravity position is compensated for.

The actuators 15 to 18 are driven based on a difference in height of the front and rear end-portion wheel ground-contact positions (end-portion wheel ground-contact position of the right end-portion wheel 14b and end-portion wheel ground-contact position of the left end-portion wheel 14a) so that the heights of the chair portion 20 and the end-portion wheel 14 (end-portion wheel ground-contact position) are simultaneously changed by the amount of this height (FIG. 9(b)). The heights of the chair portion 20 and the end-portion wheel 14 are not always required to be changed simultaneously, and a slight error may be provided. When the ascending or descending of the stairs is ended, both the third joint actuators 17 are driven so that the added center-of-gravity position is located at the center of both the leg portions 10 (FIG. 9(b) and FIG. 9(c)).

Similarly to the posture control in the front-rear direction of the moving device, the posture control in the right-left direction of the moving device can also be performed through use of a counteracting force obtained when a weight such as a battery is moved in the right-left direction, or can also be performed by installing a flywheel on the chair portion 20 so that a gyroscopic moment is used.

Here, the case of raising the right leg portion 10b and thereafter raising the left leg portion 10a to ascend stairs is given as an example, but an operation of a case of raising the left leg portion 10a and thereafter raising the right leg portion 10b to ascend stairs is also similar thereto.

In the posture control in the front-rear direction at the time of ascending or descending stairs and the posture control in the right-left direction at the time of ascending or descending stairs, posture control in a case of ascending stairs is given as an example. However, even in a case of descending stairs, posture control is performed by a method similar to that in the case of ascending stairs except that the raising and lowering of the leg portions 10 become opposite.

[Motion Control against Disturbance]

Figure 10:
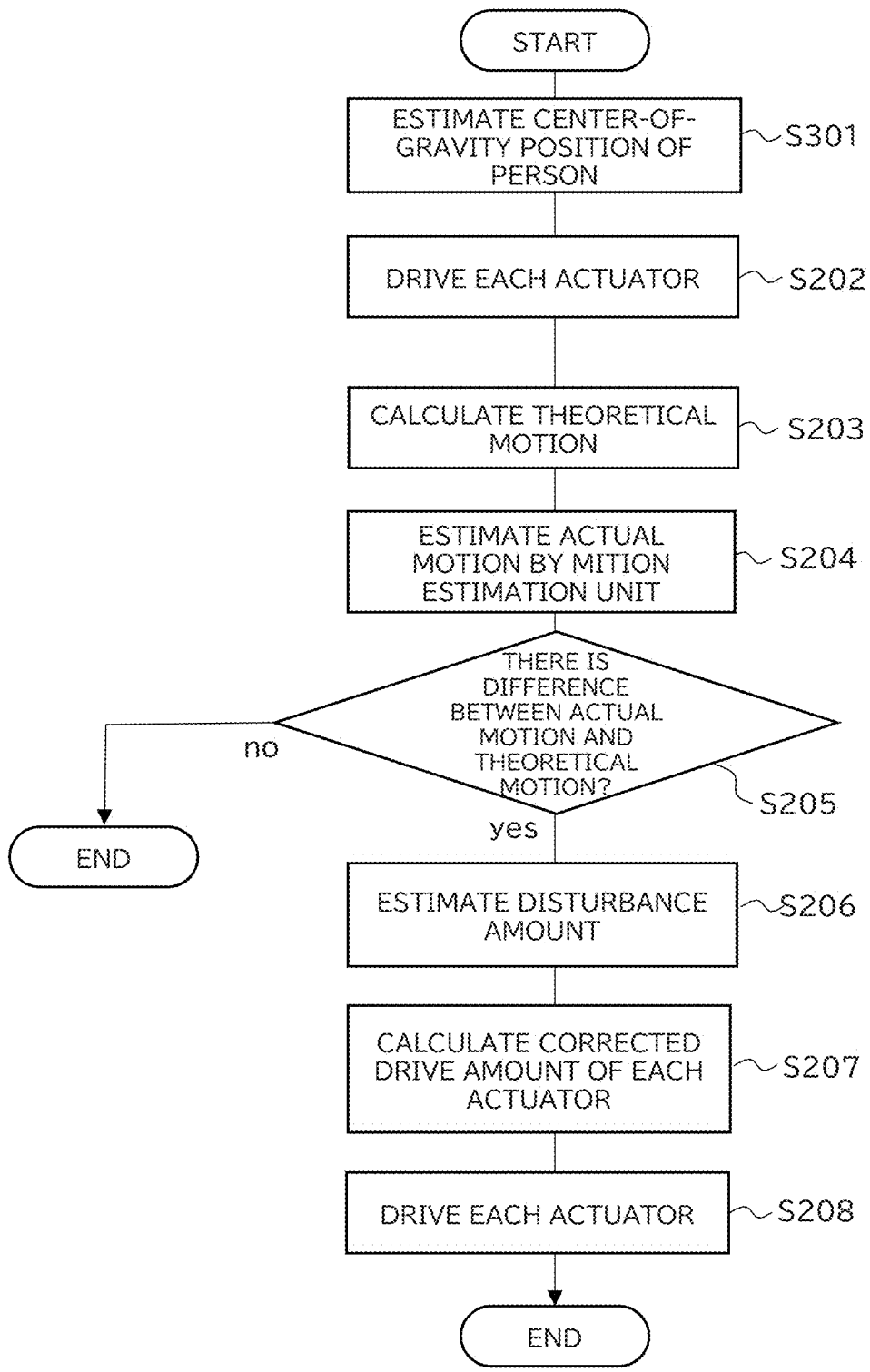
FIG. 10 is a flow chart for illustrating an example of motion control against a disturbance.

Next, an example of the motion control against a disturbance is described. In the moving device according to this embodiment, control is performed against a disturbance by a procedure illustrated in FIG. 10.

(1) The center-of-gravity position of the moving object (person) X is estimated from the detection signal obtained by the seat sensor 24 (Step S201).

(2) The actuators 15 to 18 are driven based on the added center-of-gravity position calculated by the added center-of-gravity calculation unit 33 (FIG. 2) (Step S202).

(3) A theoretical motion occurring when the actuators 15 to 18 are driven is calculated by the theoretical motion calculation unit 36 (FIG. 2) based on the added center-of-gravity position (Step S203).

(4) An actual motion is estimated by the motion estimation unit 37 (FIG. 2) from the information obtained by the inertial sensor 26 (Step S204).

(5) The theoretical motion calculated in Item (3) and the actual motion estimated in Item (4) are compared to each other, and whether or not there is a difference therebetween is determined (Step S205).

(6) When it is determined in Item (5) that there is no difference between the actual motion and the theoretical motion, it is determined that there is no disturbance, and no motion control is performed against a disturbance.

(7) When it is determined in Item (5) that there is a difference between the actual motion and the theoretical motion, it is determined that there is a disturbance corresponding to this difference, and the disturbance amount is estimated by the disturbance amount estimation unit 38 based on an amount of this difference (Step S206).

(8) After the disturbance amount is estimated in Item (7), a corrected drive amount of each of the actuators 15 to 18 is calculated by the corrected drive amount calculation unit 39 based on the estimated disturbance amount (Step S207).

(9) Each of the actuators 15 to 18 is driven by the motion control unit 31 based on the corrected drive amount calculated in Item (8) so that the motion against a disturbance is controlled (Step S208).

For the estimation of the actual motion performed by the motion estimation unit 37 in Item (4), changes in an estimated value of the center-of-gravity position of a person obtained by drive torque of each of the actuators 15 to 18 and the seat sensor 24 can also be used.

Figure 14:
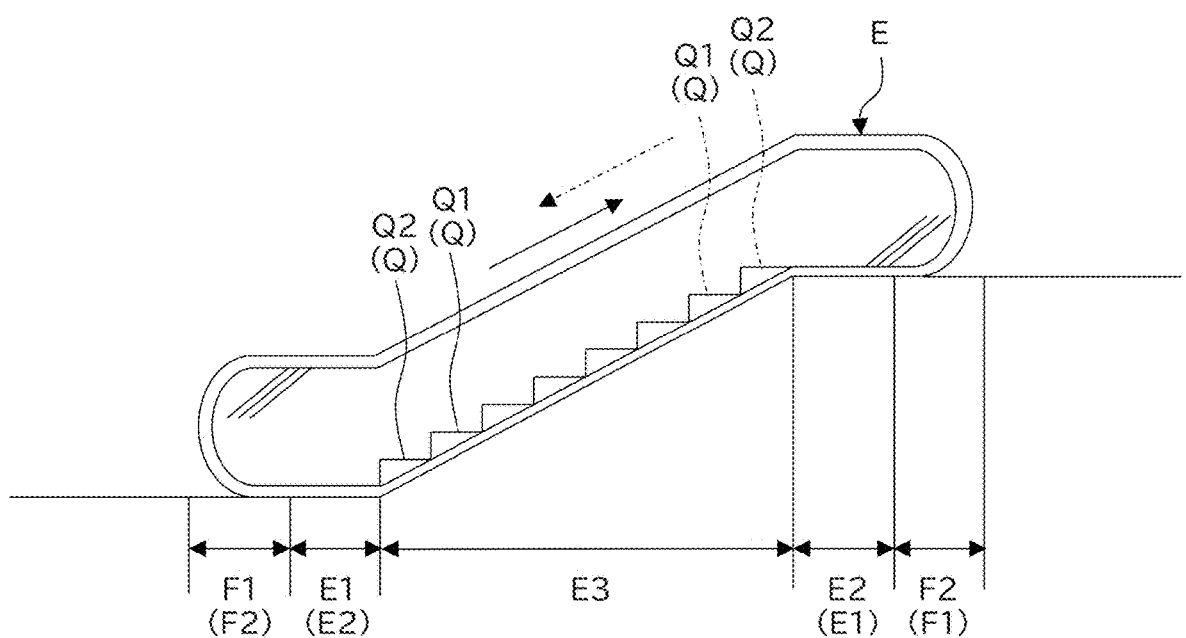
FIG. 14 is a side view for illustrating an example of an escalator.
Figure 15:
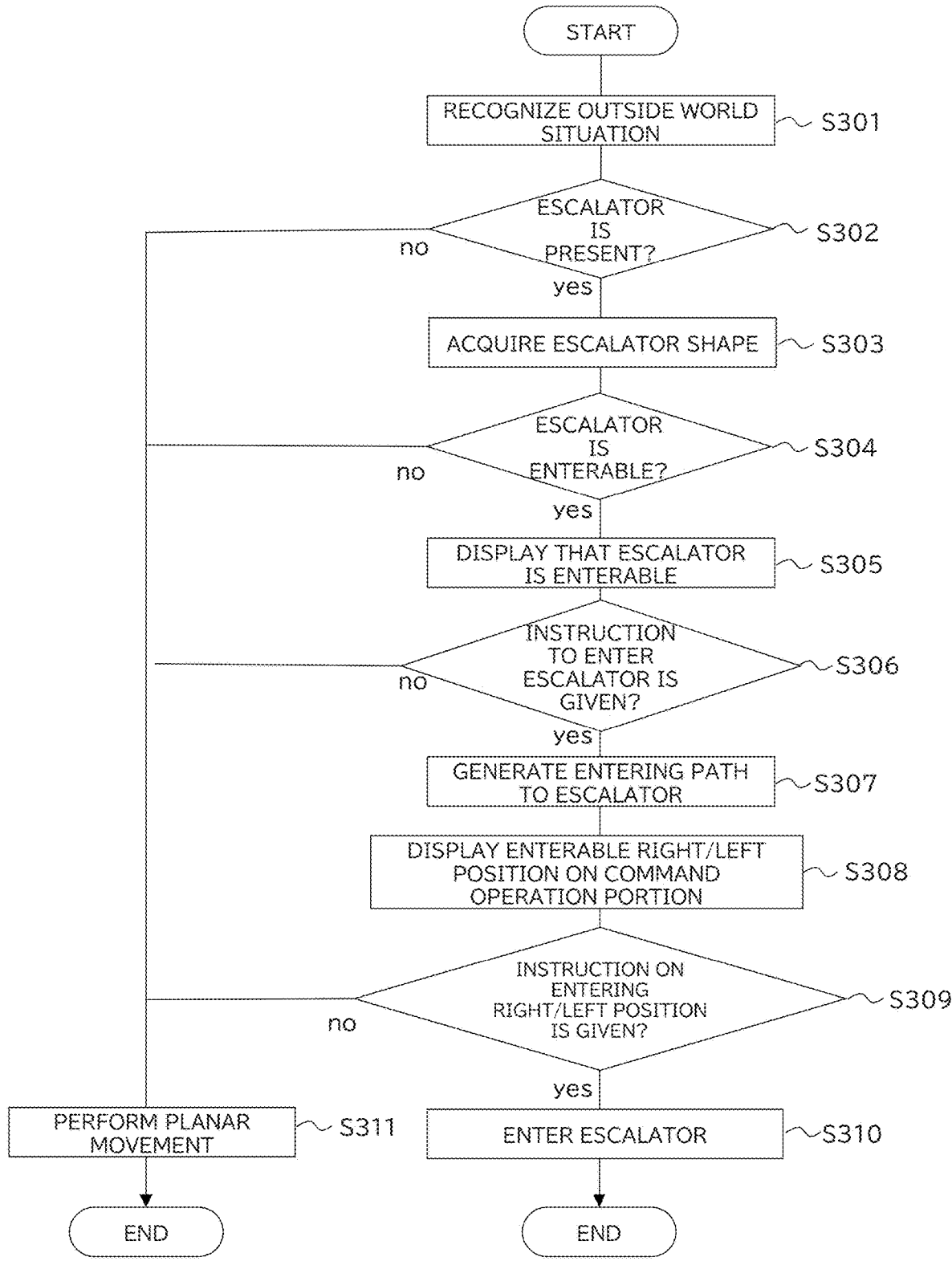
FIG. 15 is a flow chart for illustrating an example of a processing procedure at the time of entering the escalator.

Next, the control of the posture at the time of entering the escalator E, the control of the posture at the time of exiting from the escalator E, and the control of the posture on the escalator E are described. There are escalators E having various structures. Here, as an example, there is given a case in which the escalator E is an escalator E including a gradient region E3 between stepless movement regions (for the sake of easy description, in the following, a stepless movement region on the entrance side is referred to as "entrance-side stepless movement region E1," and a stepless movement region on the exit side is referred to as "exit-side stepless movement region E2") in which there is no difference in height between front and rear steps Q provided on the entrance side and the exit side as illustrated in FIG. 14. In the gradient region E3, a difference in height is caused between the front and rear steps Q. First, with reference to FIG. 15, processing at the time of entering the escalator E is described.

[Processing at Time of Entering Escalator]

(1) An outside world situation is recognized by the outside world recognition sensor 25 (Step S301). The recognition of the outside world situation performed by the outside world recognition sensor 25 is an operation which is always performed during movement using the moving device.

(2) The presence or absence of the escalator E is determined based on the information acquired by the outside world recognition sensor 25 (Step S302).

(3) As a result of the determination in Item (2), when it is determined that the escalator E is absent, the moving device continues the planar movement (Step S311).

(4) As a result of the determination in Item (2), when it is determined that the escalator E is present, the shape of the escalator E (hereinafter referred to as "escalator shape") is acquired by the outside world recognition sensor 25 (Step S303). Here, the escalator shape includes, for example, in addition to the height and the width of the step Q, a width between right and left handrail portions of the escalator E, a distance in the front-rear direction of the stepless movement region, and the like.

(5) When the escalator shape is acquired in Item (4), whether or not this escalator E is enterable is determined (Step S304). In this embodiment, it is determined as "enterable" when the escalator shape can be recognized by the outside world recognition sensor 25, and it is determined as "not enterable" when the escalator shape cannot be recognized by the outside world recognition sensor 25.

(6) When it is determined in Item (5) that the escalator E is not enterable, the moving device continues the planar movement (Step S311).

(7) When it is determined in Item (5) that the escalator E is enterable, this escalator shape is transmitted to the motion control unit 31, and the fact that the escalator E is enterable is displayed on a display screen of the command operation portion 22. As an example of the display, a button such as "getting on escalator" or the like can be given.

(8) After the display in Item (7), whether or not there is an instruction to enter the escalator E from the command operation portion 22 is determined (Step S306).

(9) When there is no instruction to enter the escalator E from the command operation portion 22 within a certain time period in Item (8), the moving device continues the planar movement (Step S311).

(10) When there is an instruction to enter the escalator E from the command operation portion 22 within a certain time period in Item (8), a moving path for entering the escalator E (hereinafter referred to as "entering path") is generated by the path generation unit 35 (Step S307). Specifically, a pathway from the boarding area F1 located before the escalator E to the first step Q is generated as the entering path. It is possible to generate only one pattern of entering path, but, in this embodiment, two or more patterns are generated.

(11) After the entering path is generated in Item (10), a right/left position at which the escalator E is enterable is displayed on the display screen of the command operation portion 22 (Step S308). On the display screen, for example, selection buttons such as "left," "middle," and "right" are displayed.

(12) After the right/left position of the entering path is displayed in Item (11), it is determined whether or not there is an instruction on the right/left position of entering the escalator E from the command operation portion 22 (Step S309). For example, when the selection buttons of "left," "middle," and "right" are displayed on the display screen, it can be determined that there is an instruction when any of the selection buttons is pressed within a certain time period, and it can be determined that there is no instruction when none of the selection buttons is pressed within the certain time period.

(13) When there is no instruction on the right/left position of entering the escalator E from the command operation portion 22 within the certain time period in Item (12), the moving device continues the planar movement (Step S311).

(14) When there is an instruction on the right/left position of entering the escalator E from the command operation portion 22 within the certain time period in Item (12), an entering path closest to this instruction is selected from among the plurality of entering paths generated in Item (10), and the moving device enters the escalator E in accordance with this entering path (Step S310).

In this embodiment, a range $W_a$ in the right-left direction in which the moving device can enter the escalator E (hereinafter referred to as "enterable right-left range $W_a$") is identified so that the center of the moving device in the width direction can enter the escalator E from a position falling within the enterable right-left range $W_a$.

Figure 16:
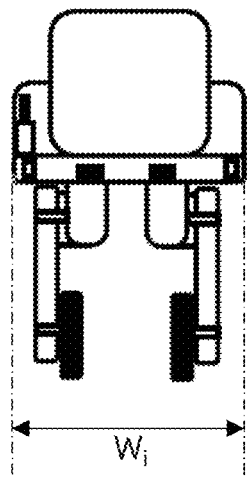
FIG. 16(a), FIG. 16(b), and FIG. 16(c) are explanatory views of an enterable right-left range in which the escalator is enterable.
Figure 16:
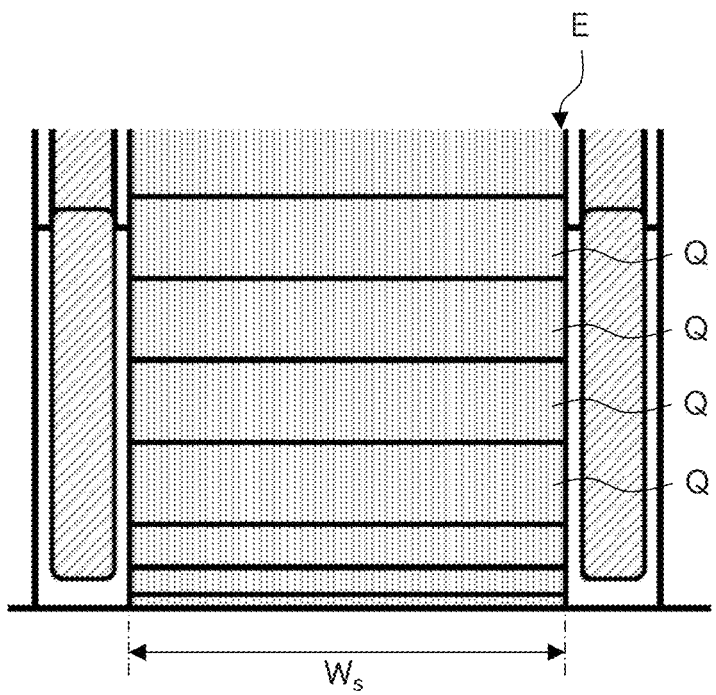
Figure 16:
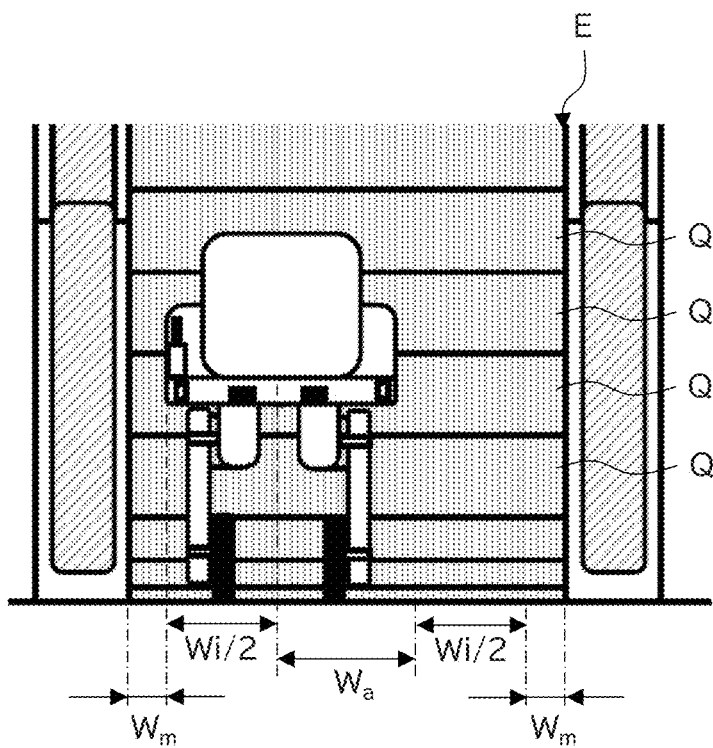

The enterable right-left range $W_a$ can be identified by, for example, as illustrated in FIG. 16(a) to FIG. 16(c), a horizontal width $W_i$ of the moving device, a width $W_s$ of the step Q of the escalator E, and right and left margins $W_m$. Specifically, when a left end of the step Q of the escalator E is set as a reference, the enterable right-left range $W_a$ can be set as a range from a spot calculated by (left margin $W_m$)+(horizontal width $W_i$ of moving device)/2 to a spot calculated by (width $W_s$ of step Q of escalator E)−(right margin $W_m$)−{(horizontal width $W_i$ of moving device)/2}.

The method of identifying the enterable right-left range $W_a$ given here is merely an example, and the enterable right-left range $W_a$ can be identified by methods other than this method.

[Control for Absorbing Speed Difference at Time of Entering Escalator]

In this embodiment, in order to absorb a speed difference between the boarding area F1 and the step Q, the following control is performed at the time of entering the escalator E.

In the case of four-wheel ground contact, both the intermediate wheels 13 first enter inside of the escalator E, and then both the end-portion wheels 14 enter inside of the escalator E. In this embodiment, first, the shape of the escalator E and the moving speed of the step Q are acquired by the outside world recognition sensor 25, and the moving device is moved at a speed equal to the moving speed (forward translational speed) of the step Q.

Both the intermediate wheels 13 in this embodiment are driven wheels (free rolls which rotate in accordance with the drive of both the end-portion wheels 14), and hence, when the moving device moving at a speed equal to the forward translational speed of the step Q moves to (enters) the step Q of the escalator E from the boarding area F1, the wheel speeds of both the intermediate wheels 13 become zero at the moment of getting on the step Q. At this time, the position and the time at which the wheel speeds of both the intermediate wheels 13 become zero are identified as a boundary between the boarding area F1 and the step Q, and coordinate values of the boundary (hereinafter referred to as "boarding area-side boundary coordinate values") and an arrival time to the boarding area-side boundary coordinate values are acquired.

After the entry of both the intermediate wheels 13, both the end-portion wheels 14 being drive wheels enter the escalator E. At this time, both the end-portion wheel actuators 18 are controlled so that the drive torque of both the end-portion wheels 14 becomes zero when both the end-portion wheels 14 arrive at the boundary between the boarding area F1 and the step Q (position identified by the boarding area-side boundary coordinate values). The phrase "arrive" used here is a concept having an allowable width in terms of time to some extent, such as right before the arrival, moment of arrival, and right after the arrival (the same holds true in the following).

In this manner, under a state in which both the end-portion wheels 14 are in contact with the boarding area F1, the wheel speeds are kept to be substantially equal to the forward translational speed of the step Q, but after both the end-portion wheels 14 are brought into contact with the step Q, the wheel speeds become zero. Thus, the speed difference between the boarding area F1 and the step Q can be absorbed. After both the end-portion wheels 14 are brought into contact with the step Q, the wheel speeds of both the end-portion wheels 14 are quickly controlled so that the wheel speeds are kept to zero. In this manner, the moving device can be moved at a speed equal to the forward translational speed of the step Q.

The contact of both the end-portion wheels 14 to the step Q may be identified by the arrival to the boarding area-side boundary coordinate values, or may be identified by detection of a change in wheel speeds of both the end-portion wheels 14, or other means can be employed as appropriate. In some cases, the entry is performed under a state in which positions in the front-rear direction of the right and left leg portions 10, more specifically, both the end-portion wheels 14 are shifted from each other, and hence the above-mentioned control is allowed to be performed for each of the right and left leg portions 10 (both the end-portion wheels 14).

As described above, in this embodiment, the forward translational speed of the step Q is estimated by the outside world recognition sensor 25 at the time of entering the escalator E, and the moving device enters the escalator E at this forward translational speed. However, the estimated value obtained by the outside world recognition sensor 25 is not always correct, and, in some cases, the wheel speeds of both the intermediate wheels 13 which have entered the step Q do not become zero.

When the wheel speeds of both the intermediate wheels 13 which have entered the step Q do not become zero, it means that an error is caused between the estimated forward translational speed of the step Q and the actual forward translational speed of the step Q. In such a case, the translational speed of the moving device is adjusted based on this error so that the wheel speeds of both the intermediate wheels 13 become zero, and thus the forward translational speed of the moving device can be caused to match the translational speed of the step Q.

Figure 17:
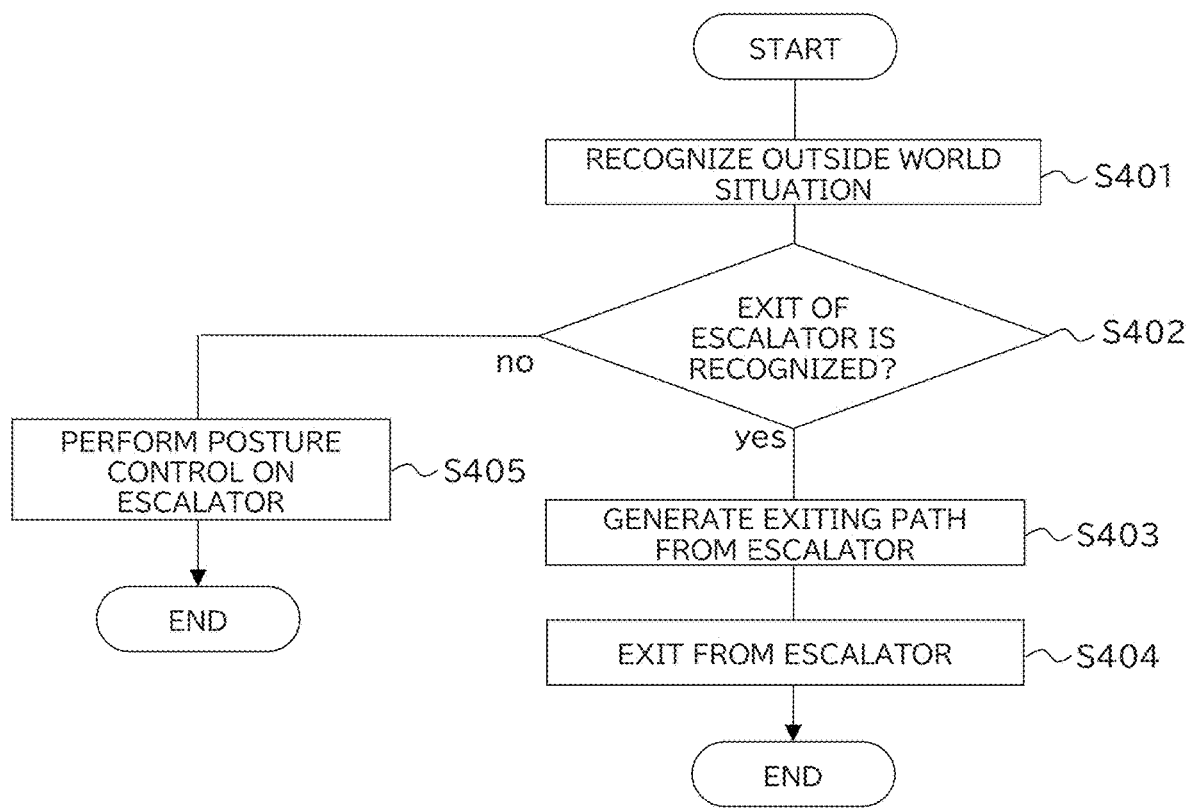
FIG. 17 is a flow chart for illustrating an example of a processing procedure at the time of exiting from the escalator.

Next, an example of processing at the time of exiting from the escalator E is described with reference to FIG. 17.

[Processing at Time of Exiting from Escalator]

(1) The outside world situation is recognized by the outside world recognition sensor 25 so that the escalator shape is acquired (Step S401). The recognition of the outside world situation performed by the outside world recognition sensor 25 is an operation which is always performed during movement using the moving device.

(2) After the escalator shape is acquired by the outside world recognition sensor 25, whether or not the exit of the escalator E is recognized is determined (Step S402).

(3) When the exit of the escalator E is not recognized by the outside world recognition sensor 25 in Item (2), posture control at the time of riding the escalator E to be described later is continued (Step S405).

(4) When the exit of the escalator E is recognized by the outside world recognition sensor 25 in Item (2), a moving path at the time of exiting from the escalator E (hereinafter referred to as "exiting path") is generated by the path generation unit 35 (Step S403). Specifically, a pathway from the ground-contact positions of both the intermediate wheels 13 and both the end-portion wheels 14 of the moving device to the landing area F2 is generated as the exiting path. It is possible to generate only one pattern of exiting path, but, in this embodiment, two or more patterns are generated.

(5) After the exiting path from the escalator E is generated in Item (4), the moving device exits from the escalator E in accordance with this exiting path (Step S404).

[Control for Absorbing Speed Difference at Time of Exiting from Escalator]

In this embodiment, in order to absorb the speed difference between the step Q and the landing area F2, the following control is performed at the time of exiting from the escalator E.

Both the intermediate wheels 13 in this embodiment are driven wheels, and hence, when both the intermediate wheels 13 move from the step Q to the landing area F2 (exit from the step Q), the wheel speeds of both the intermediate wheels 13 are increased at the moment of arrival to the landing area F2. At this time, the position and the time at which the wheel speeds of both the intermediate wheels 13 are increased are identified as a boundary between the step Q and the landing area F2, and coordinate values of the boundary (hereinafter referred to as "landing area-side boundary coordinate values") and an arrival time to the landing area-side boundary coordinate values are acquired.

After both the intermediate wheels 13 exit from the escalator E, both the end-portion wheels 14 being drive wheels exit from the escalator E. At this time, the drive torque is controlled by both the end-portion wheel actuators 18 so that the wheel speeds of both the end-portion wheels 14 become equal to the wheel speeds of both the intermediate wheels 13 when both the end-portion wheels 14 arrive at the boundary between the step Q and the landing area F2 (position identified by the landing area-side boundary coordinate values). In this manner, the speed difference between the step Q and the landing area F2 can be absorbed.

The control methods used at the time of absorbing the speed difference described here are merely examples, and the speed difference between the boarding area F1 and the step Q and the speed difference between the step Q and the landing area F2 may be absorbed by control methods other than those methods.

Similarly to the case of entering the escalator E, also in the case of exiting from the escalator E, in some cases, the exiting is performed under a state in which positions in the front-rear direction of the right and left leg portions 10, more specifically, both the end-portion wheels 14 are shifted from each other, and hence the above-mentioned control is allowed to be performed for each of the right and left leg portions 10 (both the end-portion wheels 14).

[Posture Control on Escalator]

Next, the posture control on the escalator E is described. Here, as an example, there is given posture control under a state of four-wheel ground contact in which both the intermediate wheels 13 and both the end-portion wheels 14 of the right and left leg portions 10 are in contact with the ground, and further under a state in which the positions in the front-rear direction of both the intermediate wheels 13 match each other and the positions in the front-rear direction of both the end-portion wheels 14 match each other.

First, with reference to FIG. 18(a) to FIG. 18(c), posture control performed when the moving device transitions from the entrance-side stepless movement region E1 to the gradient region E3 on the ascending escalator E is described.

FIG. 18(a) shows a state in which the moving device is positioned in the entrance-side stepless movement region E1 of the ascending escalator E. The moving device is riding on the escalator E under a state in which both the intermediate wheels 13 and both the end-portion wheels 14 straddle two steps Q, specifically, a state in which both the intermediate wheels 13 are in contact with a step Q on the front side in the traveling direction (hereinafter referred to as "first step Q1") and both the end-portion wheels 14 are in contact with a step Q following the first step Q1 (hereinafter referred to as "second step Q2").

Under this state, there is no difference in a height direction (hereinafter referred to as "difference in height") between both the intermediate wheels 13 and both the end-portion wheels 14. As described above, when no difference in height is caused between both the intermediate wheels 13 and both the end-portion wheels 14, both the end-portion wheel actuators 18 are driven, and both the end-portion wheels 14 are controlled so that the ground-contact positions of both the intermediate wheels 13 and both the end-portion wheels 14 on the respective steps Q are prevented from moving due to the driving.

Figure 18:
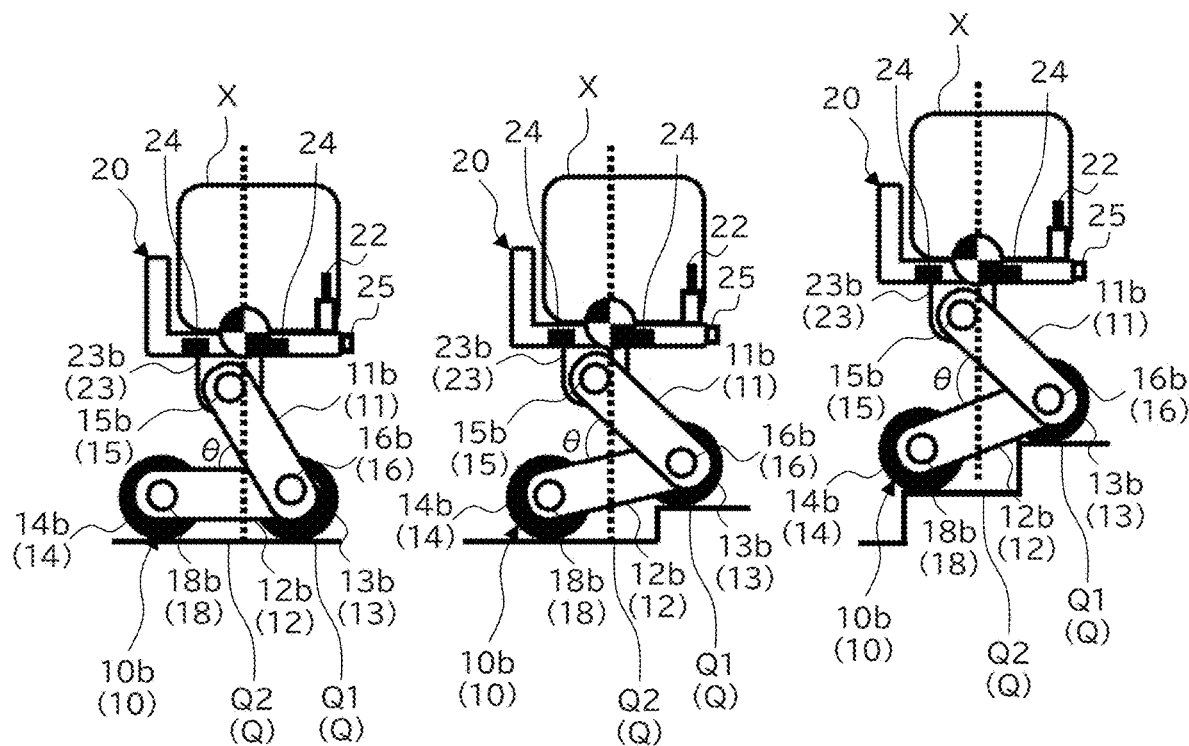
FIG. 18(a), FIG. 18(b), and FIG. 18(c) are control explanatory views of a posture at the time of entering the escalator.

When the moving device moves from the entrance-side stepless movement region E1 to the gradient region E3 and the first step Q1 starts to rise, as illustrated in FIG. 18(*b*), both the intermediate wheels 13 become higher than both the end-portion wheels 14, and thus a difference in height is caused between both the intermediate wheels 13 and both the end-portion wheels 14.

In this embodiment, when a difference in height is caused between both the intermediate wheels 13 and both the end-portion wheels 14 due to the rising of the first step Q1 as described above, both the first joint actuators 15 and both the second joint actuators 16 are driven so that the placement portion 20 is maintained horizontal, and so that the position in the front-rear direction of the added center-of-gravity position is located at the midway between the end-portion wheel ground-contact position and the intermediate wheel ground-contact position. With this driving, the placement portion 20 is maintained horizontal. The term "horizontal" used in this application is not limited to "horizontal" in a strict sense, and is a concept including a case having a slight error.

Specifically, both the first joint actuators 15 and both the second joint actuators 16 are driven so that an angle θ formed by the upper link 11 and the lower link 12 is increased along with the rising of the first step Q1. With this driving, the placement portion 20 is maintained horizontal.

When the first step Q1 further rises from the state of FIG. 18(*b*) so as to reach the highest position, as illustrated in FIG. 18(*c*), the difference in height between both the intermediate wheels 13 and both the end-portion wheels 14 becomes maximum. In this embodiment, even while the state of FIG. 18(*b*) is brought to the state of FIG. 18(*c*), the placement portion 20 is maintained horizontal by means of the driving of the first joint actuators 15 and the second joint actuators 16.

Next, with reference to FIG. 19(*a*) to FIG. 18(*c*), posture control of the moving device performed when the moving device transitions from the entrance-side stepless movement region E1 to the gradient region E3 on the descending escalator E is described.

FIG. 19(*a*) shows a state in which the moving device is positioned in the entrance-side stepless movement region E1. Similarly to the case of riding on the ascending escalator E, the moving device is riding on the escalator E under a state in which both the intermediate wheels 13 and both the end-portion wheels 14 straddle two steps Q, specifically, a state in which both the intermediate wheels 13 are in contact with the first step Q1 and both the end-portion wheels 14 are in contact with the second step Q2.

Under this state, there is no difference in height between both the intermediate wheels 13 and both the end-portion wheels 14. As described above, when no difference in height is caused between both the intermediate wheels 13 and both the end-portion wheels 14, both the end-portion wheel actuators 18 are driven, and both the end-portion wheels 14 are controlled so that the ground-contact positions of both the intermediate wheels 13 and both the end-portion wheels 14 on the respective steps Q are prevented from moving due to the driving.

When the moving device moves from the entrance-side stepless movement region E1 to the gradient region E3 and the first step Q1 starts to fall, as illustrated in FIG. 19(*b*), both the intermediate wheels 13 become lower than both the end-portion wheels 14, and thus a difference in height is caused between both the intermediate wheels 13 and both the end-portion wheels 14.

In this embodiment, when a difference in height is caused between both the intermediate wheels 13 and both the end-portion wheels 14 due to the lowering of the first step Q1 as described above, both the first joint actuators 15 and both the second joint actuators 16 are driven so that the placement portion 20 is maintained horizontal, and so that the position in the front-rear direction of the added center-of-gravity position is located at the midway between the end-portion wheel ground-contact position and the intermediate wheel ground-contact position. With this driving, the placement portion 20 is maintained horizontal.

Specifically, both the first joint actuators 15 and both the second joint actuators 16 are driven so that the angle θ formed by the upper link 11 and the lower link 12 is decreased along with the lowering of the first step Q1. With this driving, the placement portion 20 is maintained horizontal.

When the first step Q1 further falls from the state of FIG. 19(*b*) so as to reach the lowest position, as illustrated in FIG. 19(*c*), the difference in height between both the intermediate wheels 13 and both the end-portion wheels 14 becomes maximum. In this embodiment, even while the state of FIG. 19(*b*) is brought to the state of FIG. 19(*c*), the posture of the placement portion 20 is controlled by means of the driving of both the first joint actuators 15 and both the second joint actuators 16.

As in the case in which the moving device reaches the exit-side stepless movement region E2, when the moving device is brought into a state of being capable of performing the planar movement, in other words, a state in which the difference in height (difference in relative position) between both the intermediate wheels 13 and both the end-portion wheels 14 becomes very small, it is determined that exiting from the escalator E is allowed, and the moving device exits from the escalator E.

Whether or not the difference in height (difference in relative position) between both the intermediate wheels 13 and both the end-portion wheels 14 has become very small (whether or not an axis connecting between the intermediate wheel 13 and the end-portion wheel 14 has become horizontal) can be determined from, for example, a current joint angle which is calculated based on the detection signal of the perpendicular direction, which is acquired by the inertial sensor 26.

Finally, the posture control of the moving device, which is common between the case of riding on the ascending escalator E and the case of riding on the descending escalator E, is described.

In this embodiment, both the end-portion wheels 14 are controlled by both the end-portion wheel actuators 18 so that, on the escalator E, both the intermediate wheels 13 and both the end-portion wheels 14 are always fixed at predetermined positions of the steps Q.

The phrase "fixed" used here means an extent that four wheels of both the intermediate wheels 13 and both the end-portion wheels 14 are positioned within a predetermined range of the steps Q, and the wheel speeds of both the intermediate wheels 13 and both the end-portion wheels 14 fixed on the steps Q become zero.

Further, in this embodiment, both the first joint actuators 15 and both the second joint actuators 16 are controlled so that, on the escalator E, a position in the front-rear direction of a center of gravity of the moving device is always located at the midway between the end-portion wheel ground-contact position and the intermediate wheel ground-contact position.

Specifically, the added center-of-gravity position is calculated by the added center-of-gravity calculation unit 33 (FIG. 2) from the detection signal obtained by the seat sensor 24, and both the first joint actuators 15 and both the second joint actuators 16 are driven based on the calculated added center-of-gravity position. In this manner, the control is performed so that the position in the front-rear direction of the center of gravity of the moving device is always located at the midway between the end-portion wheel ground-contact position and the intermediate wheel ground-contact position.

The control method to be performed when there is a change in the added center-of-gravity position may be other than this method. For example, the position in the front-rear direction of the added center-of-gravity position can be changed by moving a weight such as a battery in the front-rear direction so that the change of the center-of-gravity position of the person riding on the moving device is compensated for.

[Switching from Four-wheel Ground Contact to Two-wheel Ground Contact]

Next, an example of control at the time of switching from the state of four-wheel ground contact to the state of two-wheel ground contact is described. The moving device according to this embodiment is capable of switching from the state of four-wheel ground contact to the state of two-wheel ground contact. The switching from the four-wheel ground contact to the two-wheel ground contact can be performed by, for example, a procedure illustrated in FIG. 11(*a*) to FIG. 11(*d*).

Figure 11:
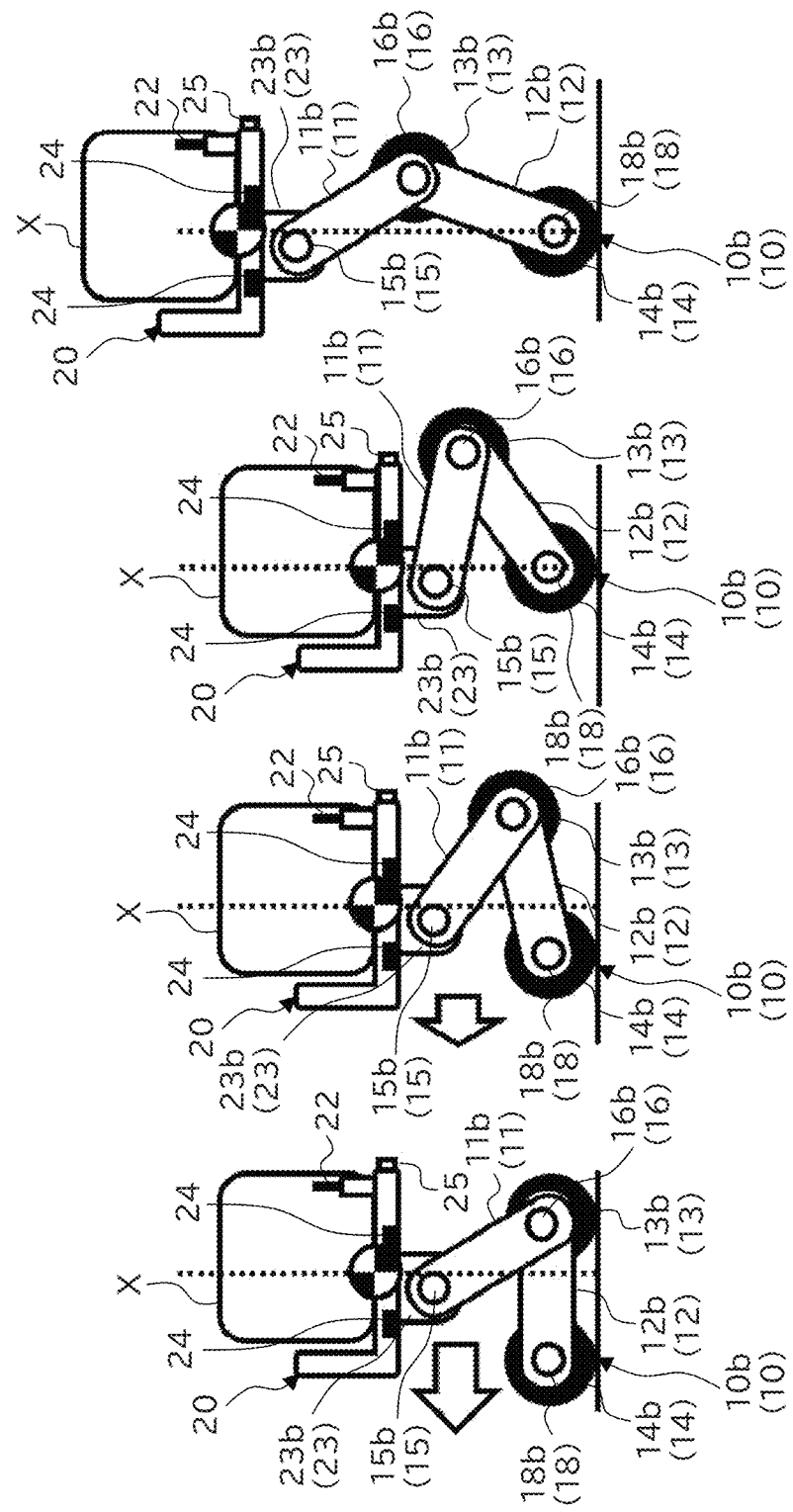
FIG. 11(a), FIG. 11(b), FIG. 11(c), and FIG. 11(d) are operation explanatory views for illustrating an example of a case in which transition is made from four-wheel ground contact to two-wheel ground contact.

(1) FIG. 11(*a*) shows a state in which four wheels of both the end-portion wheels 14 and both the intermediate wheels 13 are in contact with the ground-contact surface.

(2) Both the end-portion wheels 14 are driven in a retreating direction under the state of FIG. 11(*a*) so that the moving device is caused to perform a translational motion to the rear side (arrow direction of FIG. 11(*a*)).

(3) After the moving device is caused to perform the translational motion to the rear side as in Item (2), both the end-portion wheels 14 are applied with drive torque in the advancing direction. At this time, both the first joint actuators 15 and both the second joint actuators 16 are driven so that the chair portion 20 moves rearward due to the inertial force, and further so that the height and the posture angle of the chair portion 20 are prevented from being changed. In this manner, both the intermediate wheels 13 are separated away from the ground surface (FIG. 11(*b*)).

(4) Under the state of Item (3), both the end-portion wheels 14, both the first joint actuators 15, and both the second joint actuators 16 are driven so that both the end-portion wheels 14 are moved forward relative to the chair portion 20.

(5) Under the state of Item (4), both the end-portion wheels 14 are driven so that, at the same time as when the retreating speed of the chair portion 20 becomes zero, the end-portion wheel ground-contact position of each of both the end-portion wheels 14 matches the front-rear direction of the added center-of-gravity position (FIG. 11(*c*)).

(6) Under the state of Item (5), after only the two right and left end-portion wheels 14 are brought into a ground-contact state, the height of the chair portion 20 is changed based on the operation of the command operation portion 22 performed by the person (FIG. 11(*d*)).

Figure 12:
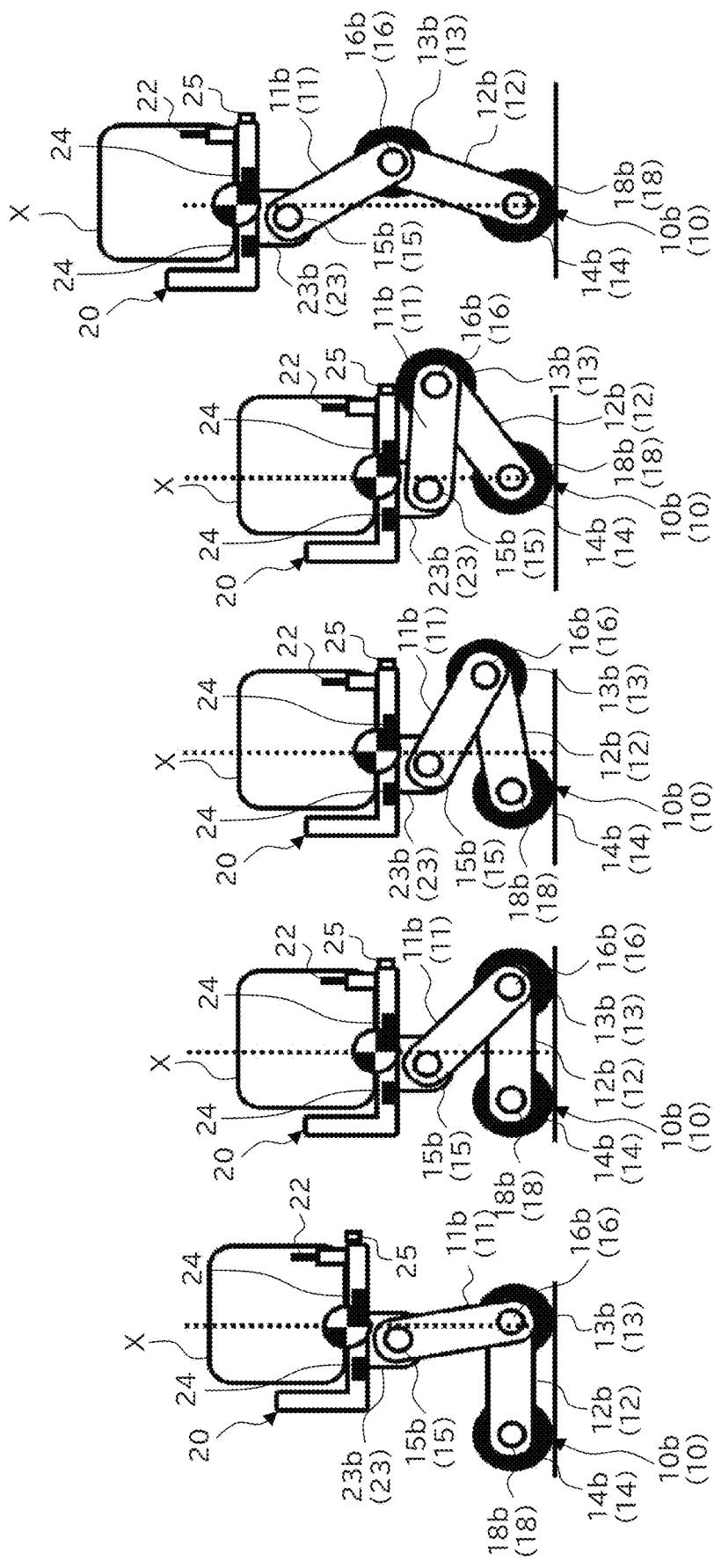
FIG. 12(a), FIG. 12(b), FIG. 12(c), FIG. 12(d), and FIG. 12(e) are operation explanatory views for illustrating another example of the case in which transition is made from the four-wheel ground contact to the two-wheel ground contact.

The switching from the four-wheel ground contact to the two-wheel ground contact of the moving device according to this embodiment can also be performed by a procedure illustrated in FIG. 12(*a*) to FIG. 12(*e*).

(1) FIG. 12(*a*) shows a state in which four wheels of both the end-portion wheels 14 and both the intermediate wheels 13 are in contact with the ground-contact surface.

(2) Under the state of Item (1), both the second joint actuators 16 are driven so that the position in the front-rear direction of the added center-of-gravity position is moved forward within a range between the ground-contact position (intermediate wheel ground-contact position) of each of both the intermediate wheels 13 and the end-portion wheel ground-contact position of each of both the end-portion wheels 14 (FIG. 12(*a*)).

(3) In order to move the chair portion 20 rearward under a state in which the chair portion 20 is kept horizontal, both the first joint actuators 15 and both the second joint actuators 16 are driven. In this manner, the added center-of-gravity position in the front-rear direction is moved rearward (FIG. 12(*b*)).

(4) While the chair portion 20 is moved rearward, both the end-portion wheels 14 are driven so as to cancel out this motion to the rear side. At the same time, both the first joint actuators 15 and both the second joint actuators 16 are driven so that both the intermediate wheels 13 are raised from the ground-contact surface (FIG. 12(*c*)).

(5) Both the first joint actuators 15 and both the second joint actuators 16 are driven so that, at the same time as when the retreating speed of the chair portion 20 becomes zero, the end-portion wheel ground-contact position of each of both the end-portion wheels 14 matches the front-rear direction of the added center-of-gravity position (FIG. 12(*d*)).

(6) After only both the end-portion wheels 14 are brought into a ground-contact state, the height of the chair portion 20 is changed based on the operation of the command operation portion 22 performed by the person (FIG. 12(*e*)).

[Switching from Two-wheel Ground Contact to Four-wheel Ground Contact]

The moving device according to this embodiment is capable of switching from the state of two-wheel ground contact to the state of four-wheel ground contact. The switching from the two-wheel ground contact to the four-wheel ground contact can be performed by, for example, a procedure illustrated in FIG. 13(*a*) to FIG. 13(*e*).

Figure 13:
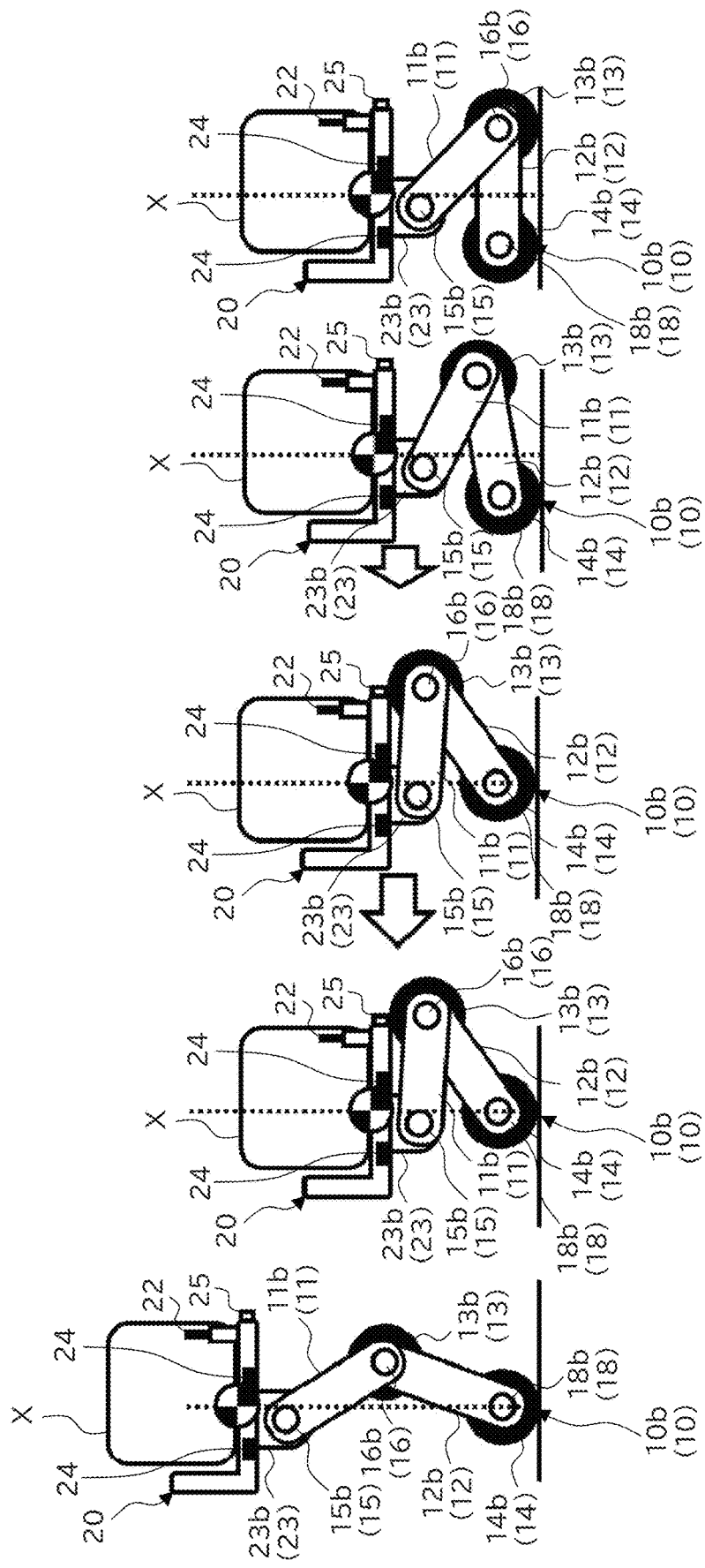
FIG. 13(a), FIG. 13(b), FIG. 13(c), FIG. 13(d), and FIG. 13(e) are operation explanatory views for illustrating an example of a case in which transition is made from the two-wheel ground contact to the four-wheel ground contact.

(1) FIG. 13(*a*) shows a state in which the moving device is standing up (standing on its own feet) under a state in which both the end-portion wheels 14 are in contact with the ground-contact surface.

(2) Under the state of Item (1), both the first joint actuators 15 and both the second joint actuators 16 are driven so that the height of the chair portion 20 is brought to a height close to the state of four-wheel ground contact (FIG. 13(*a*) and FIG. 13(*b*)).

(3) Under the state of Item (2), both the end-portion wheels 14 are driven so that the moving device is caused to perform the translational motion to the rear side (arrow direction of FIG. 13(*c*)) (FIG. 13(*c*)).

(4) Under the state of Item (3), both the end-portion wheels 14 are driven so as to cancel out the inertial force to the rear side of the moving device. At the same time, both the first joint actuators 15 and both the second joint actuators 16 are driven so that both the end-portion wheels 14 are moved rearward relative to the chair portion 20 (FIG. 13(*d*)).

(5) Under the state of Item (4), both the first joint actuators 15 and both the second joint actuators 16 are driven so that both the intermediate wheels 13 are brought into contact with the ground at the same time as when the translational speed of the moving device becomes zero (FIG. 13(*e*)).

The above-mentioned switching control is merely an example, and the switching from the four-wheel ground contact to the two-wheel ground contact and the switching from the two-wheel ground contact to the four-wheel ground contact can be controlled by methods other than those methods.

The moving device according to this embodiment can stand up on a single tread (corresponding to one step of the stairs) by the two leg portions 10 through control of the leg portions 10 performed by the control unit 30. In addition, the moving device according to this embodiment can stand up under a state in which the end-portion wheel 14 of one leg portion 10 is brought into contact with a first tread of the stairs, and the end-portion wheel 14 of the other leg portion 10 is brought into contact with a second tread following the first tread. Accordingly, as long as there is an occupied space equivalent to that required when a person ascends or descends the stairs, the stairs can be ascended or descended with biped walking.

Other Embodiment

The above-mentioned embodiment gives an example of a moving device (chair-type moving device) for moving a person while having the person loaded thereon, but the moving device according to the present invention can also be used as a luggage moving device or the like for moving something other than a person, for example, luggage, while having the luggage loaded thereon. When the moving device according to the present invention is used as the luggage moving device, in place of the chair portion 20, a luggage loading portion on which the luggage can be loaded can be set as the placement portion 20.

In the above-mentioned embodiment, as an example, there is given a case in which remaining stationary, moving forward, moving backward, turning, switching from the four-wheel ground contact to the two-wheel ground contact, and switching from the two-wheel ground contact to the four-wheel ground contact are performed under a state in which both the end-portion wheels 14 are not shifted from each other in the front-rear direction (under a state in which both the end-portion wheels 14 are positioned side by side), but those operations can also be performed under a state in which both the leg portions 10 (both the end-portion wheels 14) are shifted from each other in the front-rear direction.

In this case, rotation of both or any one of both the end-portion wheels 14 is controlled so that the added center-of-gravity position and the end-portion wheel ground-contact position of any one of both the end-portion wheels 14 match each other. In this manner, the postures in the front-rear direction and the right-left direction of the moving device can be controlled at the time of remaining stationary, moving forward, moving backward, turning, switching from the four-wheel ground contact to the two-wheel ground contact, and switching from the two-wheel ground contact to the four-wheel ground contact.

When the end-portion wheel ground-contact positions of both the end-portion wheels 14 are shifted from each other in the front-rear direction under a state in which the moving device is standing up with both the end-portion wheels 14, the added center-of-gravity position is located on a straight line connecting between both the end-portion wheel ground-contact positions. In this manner, the posture of the moving device can be controlled.

In the above-mentioned embodiment, as an example, there is given a case in which the moving device gets on and off the escalator E under the state of four-wheel ground contact, but the moving device according to the present invention can also get on and off the escalator E under the state of two-wheel ground contact in which both the end-portion wheels 14a and 14b are in contact with the ground.

Now, control for absorbing the speed difference at the time of getting on or off the escalator E under the state of two-wheel ground contact is described. The processing flow used at the time of getting on or off the escalator E under the state of two-wheel ground contact is similar to that in the case of getting on or off the escalator E under the state of four-wheel ground contact.

In a case of entering the escalator E under the state of two-wheel ground contact, when the speeds of both the end-portion wheels 14 are controlled so as to be substantially equal to the forward translational speed of the step Q, the drive torque of both the end-portion wheels 14 is reduced at the moment of getting on the step Q. At this time, the change of the drive torque of both the end-portion wheels 14 is detected by a torque sensor (not shown) or the like so that it is determined that both the end-portion wheels 14 have arrived at the step Q from the boarding area F1. The translational speed of the moving device is controlled so as to be equal to the forward translational speed of the step Q at the time when both the end-portion wheels 14 arrive at the step Q.

In the case of two-wheel ground contact, the control of the translational speed of the moving device and the posture control are simultaneously performed, and hence the translational speed and the wheel speed do not match each other. Accordingly, the speed difference cannot be absorbed by simply controlling the wheel speed. However, as described above, when the translational speed of the moving device is controlled so as to be equal to the forward translational speed of the step Q at the time when both the end-portion wheels 14 arrive at the step Q, the moving device can be moved such that the speed relative to the step Q becomes zero.

Meanwhile, the following control is performed in a case of exiting from the escalator E under the state of two-wheel ground contact. In the case of exiting from the escalator E under the state of two-wheel ground contact, under a state in which both the end-portion wheels 14 are present on the step Q, the translational speed of the moving device with respect to the forward translational speed of the step Q is controlled so as to become zero. In this case, when both the end-portion wheels 14 of the moving device arrive at the landing area F2 of the escalator E, the landing area F2 and the moving device have a relative speed difference corresponding to the forward translational speed of the step Q, and hence the drive torque of both the end-portion wheels 14 for controlling the speed rises.

At this time, the change of the drive torque of both the end-portion wheels 14 is detected by a torque sensor (not shown) or the like so that it is determined that both the end-portion wheels 14 have arrived at the landing area F2 from the step Q. The drive torque of both the end-portion wheels 14 is controlled so that, at the time when both the end-portion wheels 14 arrive at the landing area F2, the translational speed of the moving device is equal on the step Q and after exiting to the landing area F.

As described above, in the moving device according to the present invention, regardless of whether the moving device is in the state of four-wheel ground contact or the state of two-wheel ground contact, the moving device can safely get on and off the escalator E while absorbing the speed difference between the step Q and the boarding/landing area F of the escalator E.

As an advantage of being capable of getting on and off the escalator E under the state of four-wheel ground contact, there is given a point that the posture at the time of getting on and off the escalator E can be easily stabilized, and thus the safety can be more ensured as compared to the case of getting on and off the escalator E under the state of two-wheel ground contact.

Meanwhile, as an advantage of being capable of getting on and off the escalator E under the state of two-wheel ground contact, there is given a point that it is not required to occupy a space more than necessary on the escalator E. In other words, there is an advantage in that the moving device can be used with a space substantially equal to that required when a person not using the moving device uses the escalator E.

Similarly to the case of four-wheel ground contact, also in the case of two-wheel ground contact, in some cases, the moving device enters the escalator E or exits from the escalator E under a state in which positions in the front-rear direction of the right and left leg portions 10, more specifically, both the end-portion wheels 14 are shifted from each other, and hence the above-mentioned control can be allowed to be performed for each of the right and left leg portions 10 (both the end-portion wheels 14).

In the above-mentioned embodiment, as an example, there is given a case in which the number of leg portions 10 is two, but the number of leg portions is only required to be at least two, and the above-mentioned embodiment does not exclude a device including three or more leg portions 10.

The configuration of the moving device according to this embodiment is merely an example, and the configuration of the moving device according to the present invention can be changed as appropriate such as being omitted, replaced, and exchanged within a range that does not depart from the gist of the present invention.

INDUSTRIAL APPLICABILITY

The moving device according to the present invention can also be used as, in addition to the moving device for moving a person while having the person loaded thereon (chair-type moving device), a moving device for moving luggage or the like other than a person while having the luggage or the like loaded thereon (luggage moving device).

REFERENCE SIGNS LIST 10 leg portion
10a left leg portion
10b right leg portion
11 upper link
11a left upper link
11b right upper link
12 lower link
12a left lower link
12b right lower link
13 intermediate wheel
13a left intermediate wheel
13b right intermediate wheel
14 end-portion wheel
14a left end-portion wheel
14b right end-portion wheel
15 first joint actuator
15a left first joint actuator
15b right first joint actuator
16 second joint actuator
16a left second joint actuator
16b right second joint actuator
17 third joint actuator
17a left third joint actuator
17b right third joint actuator
18 end-portion wheel actuator
18a left end-portion wheel actuator
18b right end-portion wheel actuator
20 placement portion (chair portion)
21 seating portion
21a seat
21b back rest
22 command operation portion
23 coupling portion
23a left bracket
23b right bracket
24 seat sensor
25 outside world recognition sensor
26 inertial sensor
30 control unit
31 motion control unit
32 center-of-gravity position estimation unit
33 added center-of-gravity calculation unit
34 determination unit
35 path generation unit
36 theoretical motion calculation unit
37 motion estimation unit
38 disturbance amount estimation unit
39 corrected drive amount calculation unit
E escalator
E1 entrance-side stepless movement region
E2 exit-side stepless movement region
E3 gradient region
F1 boarding area
F2 landing area
Q step
Q1 first step
Q2 second step
X moving object

The invention claimed is:

1. A moving device for moving a moving object while having the moving object loaded thereon, the moving device comprising:

two leg portions each including an end-portion wheel and an intermediate wheel;

a placement portion supported by the two leg portions; and a control unit configured to control the two leg portions, wherein, under a state of four-wheel ground contact in which both of the end-portion wheels that are rear wheels and both of the intermediate wheels that are front wheels are in contact with a ground, when the end-portion wheel is moved from a boarding area to a step of an escalator and/or when the end-portion wheel is moved from the step to a landing area of the escalator, a wheel speed of both of the end-portion wheels that are rear wheels is controlled by the control unit, wherein the control unit is configured to acquire coordinate values obtained when the intermediate wheel is moved from the boarding area to the step or when the intermediate wheel is moved from the step to the landing area, and to control the wheel speed of the end-portion wheel when the end-portion wheel arrives at a position identified by the coordinate values.

2. The moving device according to claim 1, further comprising an end-portion wheel actuator configured to drive the end-portion wheel, wherein the control unit is configured to control the end-portion wheel actuator so that, when the end-portion wheel is moved from the boarding area to the step, the wheel speed of the end-portion wheel becomes zero.

3. The moving device according to claim 1, further comprising an end-portion wheel actuator configured to drive the end-portion wheel,
wherein the control unit is configured to control the end-portion wheel actuator so that, when the end-portion wheel is moved from the step to the landing area, the wheel speed of the end-portion wheel becomes equal to a wheel speed of the intermediate wheel.

4. A moving device for moving a moving object while having the moving object loaded thereon, the moving device comprising:
two leg portions each including an end-portion wheel and an intermediate wheel;
a placement portion supported by the two leg portions;
a control unit configured to control the two leg portions; and
an end-portion wheel actuation configured to drive the end-portion wheel,
wherein, under a state of two-wheel ground contact in which both of the end-portion wheels are in contact with a ground, when the end-portion wheel is moved from a boarding area to a step of an escalator and/or when the end-portion wheel is moved from the step to a landing area of the escalator, a translational speed of the moving device is controlled by the control unit,
wherein the control unit is configured to (a) control the end-portion wheel actuator so that, when the end-portion wheel is moved from the boarding area to the step, the translational speed of the moving device becomes equal to a forward translational speed of the step, and/or (b) control drive torque of both end-portion wheels so that, when the end-portion wheel is moved from the step to the landing area, the translational speed of the moving device is equal on the step and after exiting to the landing area.

5. The moving device according to claim 1,
wherein each of the two leg portions includes:
an upper link;
a lower link coupled to the upper link;
the intermediate wheel;
the end-portion wheel provided at a lower end of the lower link;
a first joint actuator configured to drive the upper link in a front-rear direction; and
a second joint actuator configured to drive the lower link in the front-rear direction, and
wherein, when a difference in a height direction is caused between the end-portion wheel and the intermediate wheel under the state of four-wheel ground contact in which the end-portion wheel and the intermediate wheel are in contact with the step of the escalator, the first joint actuator and the second joint actuator are driven so that the placement portion is maintained horizontal.

6. The moving device according to claim 5, wherein the first joint actuator and the second joint actuator are driven when the difference in the height direction is caused between the intermediate wheel and the end-portion wheel under the state of four-wheel ground contact in which the intermediate wheel is in contact with a first step and the end-portion wheel is in contact with a second step following the first step.

7. The moving device according to claim 5, wherein, when the difference in the height direction is caused between the intermediate wheel and the end-portion wheel due to rising of a first step, the first joint actuator and the second joint actuator are driven so that an angle formed by the upper link and the lower link is increased.

8. The moving device according to claim 5, wherein, when the difference in the height direction is caused between the intermediate wheel and the end-portion wheel due to lowering of a first step, the first joint actuator and the second joint actuator are driven so that an angle formed by the upper link and the lower link is decreased.

9. The moving device according to claim 5, wherein, when a change in an added center-of-gravity position is caused on the escalator, the first joint actuator and the second joint actuator are driven so that a position in the front-rear direction of the added center-of-gravity position is located midway between an end-portion wheel ground-contact position and an intermediate wheel ground-contact position.

10. The moving device according to claim 9, wherein the first joint actuator and the second joint actuator are driven when the change in the added center-of-gravity position is caused by a change in a center of gravity of the moving object and/or the moving device on the escalator.

11. The moving device according to claim 9, wherein the first joint actuator and the second joint actuator are driven when the change in the added center-of-gravity position is caused by a change in a height of the step of the escalator.

* * * * *

UNITED STATES PATENT AND TRADEMARK OFFICE
CERTIFICATE OF CORRECTION

PATENT NO. : 12,268,641 B2
APPLICATION NO. : 18/270756
DATED : April 8, 2025
INVENTOR(S) : Hiroshi Nakano Page 1 of 1

It is certified that error appears in the above-identified patent and that said Letters Patent is hereby corrected as shown below:

In the Claims

Column 27, Claim 4, Line 20, "actuation" should be ---actuator---.

Signed and Sealed this
Twentieth Day of May, 2025

Coke Morgan Stewart
*Acting Director of the United States Patent and Trademark Office*